(12) United States Patent  (10) Patent No.: US 8,451,286 B2
Muramoto  (45) Date of Patent: May 28, 2013

(54) IMAGE DISPLAY METHOD AND IMAGE DISPLAY APPARATUS, AS WELL AS PRINTING ASSISTING SYSTEM

(75) Inventor: Yasuhiko Muramoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 904 days.

(21) Appl. No.: 12/534,516

(22) Filed: Aug. 3, 2009

(65) Prior Publication Data

US 2010/0026711 A1    Feb. 4, 2010

(30) Foreign Application Priority Data

Aug. 4, 2008  (JP) ................................ 2008-201065

(51) Int. Cl.
  *G09G 5/02*  (2006.01)
  *G09G 5/00*  (2006.01)

(52) U.S. Cl.
  USPC .......................................... 345/592; 345/629

(58) Field of Classification Search
  None
  See application file for complete search history.

(56) References Cited

U.S. PATENT DOCUMENTS

2003/0122844 A1*  7/2003  Mueller et al. ................ 345/589
2007/0070470 A1   3/2007  Takami et al.

FOREIGN PATENT DOCUMENTS

JP        3441794     6/2003
JP     2007-110676    4/2007

OTHER PUBLICATIONS

JP Office Action dated Sep. 20, 2012, Application No. 2008-201065.

* cited by examiner

*Primary Examiner* — Ryan R Yang
(74) *Attorney, Agent, or Firm* — Young & Thompson

(57) ABSTRACT

The present invention provides an image display method including the steps of displaying an image printed on a front surface of a first recording medium; generating a transmissive image which represents an image that is printed on a front surface of a second recording medium which is laid under the first recording medium and seen through the first recording medium; and displaying the transmissive image superimposed on the image printed on the front surface of the first recording medium.

11 Claims, 43 Drawing Sheets

FIG.14

| SERVER FUNCTION | REMOTE SERVER DEVICE | PRINTING PROCESSING SERVER DEVICE |
|---|---|---|
| WEB SERVER FUNCTION | ○ | ○ |
| JOB REGISTRATION FUNCTION | ○ | |
| JOB MANAGEMENT FUNCTION | ○ | |
| USER MANAGEMENT FUNCTION | ○ | |
| DRAFT SAVING FUNCTION | ○ | |
| THUMBNAIL CREATION FUNCTION | ○ | |
| PAGE PDF CREATION FUNCTION | ○ | |
| PAGE MANIPULATION INFORMATION SAVING FUNCTION | ○ | |
| COLOR-SEPARATED IMAGE TRANSMISSION FUNCTION | ○ | |
| PROOFREADING INFORMATION SAVING FUNCTION | ○ | |
| PROOFREAD PDF CREATION FUNCTION | ○ | |
| JOB APPROVING FUNCTION | ○ | |
| PRE-FLIGHTING FUNCTION | | ○ |
| COLOR-SEPARATED RIP FUNCTION | | ○ |
| PRINTING JOB REGISTRATION FUNCTION | | ○ |

FIG.16

| TERMINAL FUNCTION | DRAFT ACCEPTING TERMINAL | PROOFREADING TERMINAL | JOB CREATION/ MANAGEMENT TERMINAL |
|---|---|---|---|
| WEB VIEWING FUNCTION | ○ | ○ | ○ |
| JOB CREATION FUNCTION | | | ○ |
| DRAFT TRANSMISSION FUNCTION | ○ | | |
| PAGE MANIPULATION FUNCTION | ○ | | |
| PROOFREADING FUNCTION<br>· COLOR-SEPARATED IMAGE COMPOSITION FUNCTION<br>· TESTING IMAGE CREATION FUNCTION<br>· PROOFREADING INFORMATION GENERATION FUNCTION | | ○ | |
| PROOFREADING CHECKING FUNCTION | ○ | | |
| APPROVAL FUNCTION | | ○ | |
| PRINTING ORDERING FUNCTION | | | ○ |
| SERVER MANAGEMENT FUNCTION | | | ○ |

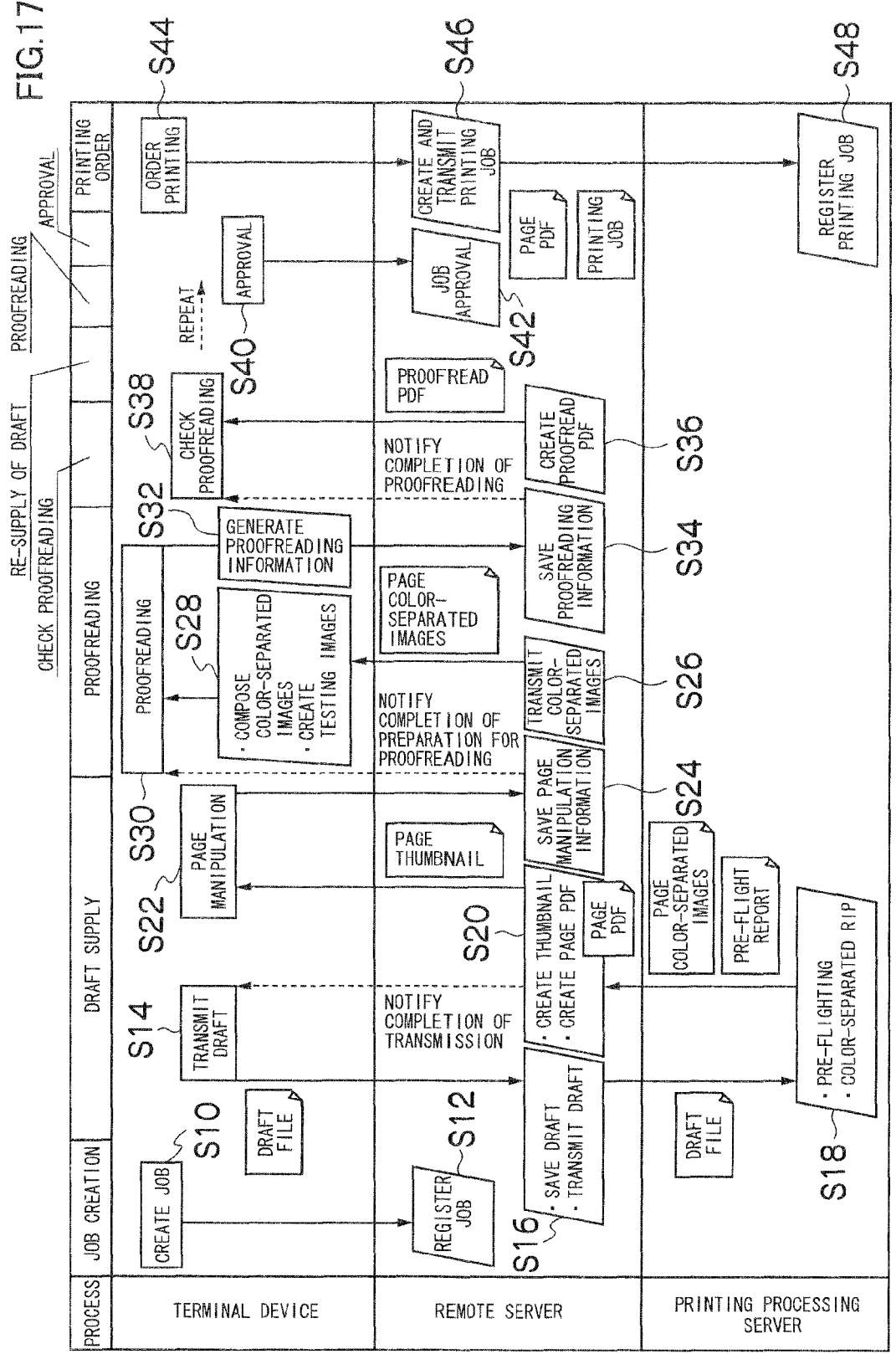

JOB LIST
ⓘ THERE IS A PRE-FLIGHT ERROR. PLEASE CHECK IT FROM JOB DETAILS
JOB NAME: [JAPANESE]   STATUS: [DRAFT SUPPLY ▽]  [🔍 SEARCH]  ← 314

| JOB ID | JOB NAME | NUMBER OF PAGES | PROOFREADING DELIVERY TIME | DATE OF UPDATE | DRAFT SUPPLY | PROOFREADING | AUTHENTICATION | JOB ISSUANCE | COLOR SEPARATION | 3D VIEW |
|---|---|---|---|---|---|---|---|---|---|---|
| 12345 | JOB1 | 100 | 2008/04/01 | 2008/03/01 | ☐ 0% | ☐ Ready | ✓ | ☐ 0% | | |
| 12346 | JOB2 | 200 | 2008/04/02 | 2008/03/02 | 50% | 10/185 | ☐ Ready | 50% | ⚠ | |
| 12347 | JOB3 | 300 | | | ✓ 100% | | | | | |
| 12348 | JOB4 | 50 | 2008/03/04 | 2008/03/04 | 50% | 0/50 | | | | |

316

? HELP    LOG OUT

FIG.22

JOB DETAIL SCREEN     318

| | |
|---|---|
| JOB ID | : 12345 |
| XMF JOB ID | : XMF12345 |
| JOB NAME | : JOB3 |
| VERSION | : 123.456.789 |
| LAST DATE OF UPDATE | : 2008/2/27 |
| JOB OWNER | : USER A |
| DRAFT SOURCE | : USER B |
| PROOFREADER | : PROOFREADER A/PROOFREADER B/PROOFREADER C/PROOFREADER D |
| APPROVER | : APPROVER Z |
| STATUS | : REVIEW |
| OUTPUTTING PRINTER | : DocuCentre1234 |

[ROLL BACK]

UPPLIED FILE
  FILE NAME : ABC.pdf
  DATE/TIME OF SUPPLY : 2008/2/13
  NUMBER OF PAGES : 100
  PRE-FLIGHT RESULT : 3 ERRORS/10 ALERTS

[SEE DETAILS]    320

REVIEW STATUS

| REVIEWER | UNREVIEWED | OK | NG |
|---|---|---|---|
| PROOFREADER A | 5 | 2 | 3 |

[HELP] [LOG OUT]

[TO JOB LIST SCREEN]

FIG.24

JOB LIST — 302C

JOB NAME: JAPANESE    STATUS: DRAFT SUPPLY ▽    🔍 SEARCH 304, 324

| JOB ID | JOB NAME | NUMBER OF PAGES | PROOFREADING DELIVERY TIME | DATE OF UPDATE | DRAFT SUPPLY | PROOFREADING | AUTHENTICATION | JOB ISSUANCE | COLOR SEPARATION | 3D VIEW |
|---|---|---|---|---|---|---|---|---|---|---|
| 12345 | JOB1 | 100 | 2008/04/01 | 2008/03/01 | 0% | Ready | ✓ | | | |
| 12346 | JOB2 | 200 | 2008/04/02 | 2008/03/02 | 50% | 10/185 | Ready | 50% | ✓ | |
| 12347 | JOB3 | 300 | 2008/04/03 | 2008/03/03 | 100% | 98/200 | ✓ | 100% | ⚠ | |
| 12348 | JOB4 | 50 | 2008/04/04 | 2008/03/04 | 50% | 0/50 | | | | |

? HELP    LOG OUT

JOB LIST

JOB NAME: JAPANESE    STATUS: DRAFT SUPPLY ▽    ? HELP   LOG OUT

| JOB ID | JOB NAME | NUMBER OF PAGES | PROOFREADING DELIVERY TIME | DATE OF UPDATE | DRAFT SUPPLY | PROOFREADING | AUTHENTICATION | JOB ISSUANCE | COLOR SEPARATION | 3D VIEW |
|---|---|---|---|---|---|---|---|---|---|---|
| 12345 | JOB1 | 100 | 2008/04/01 | 2008/03/01 | 0% | Ready | ✓ | 0% | | |
| 12346 | JOB2 | 200 | 2008/04/02 | 2008/03/02 | 50% | 10/185 | Ready | 50% | | |
| 12347 | JOB3 | 300 | 2008/04/03 | 2008/03/03 | 100% | 98/200 | ✓ | 100% | ✓ | |
| 12348 | JOB4 | 50 | 2008/03/04 | 2008/03/04 | 50% | 0/50 | | | △ | |

🔒 LOG IN

LANGUAGE
FOR DISPLAY: [ JAPANESE ▽ ]

LOGIN ID     [ f-company          ]

PASSWORD:    [ * * * * * * *      ]

[ LOG IN ]

FIG.31

JOB LIST
① THERE ARE XX UNREVIEWED JOBS.
JOB NAME: JAPANESE    STATUS: DRAFT SUPPLY ▽    🔍 SEARCH

| JOB ID | JOB NAME | NUMBER OF PAGES | PROOFREADING DELIVERY TIME | DATE O UPDATE | DRAFT SUPPLY | PROOFREADING | AUTHENTICATION | JOB ISSUANCE | COLOR SEPARATION | 3D VIEW |
|---|---|---|---|---|---|---|---|---|---|---|
| 12345 | JOB1 | 100 | 2008/04/01 | 2008/03/01 | ☐ 0% | ☐ Ready | ✓ | ☐ 0% | | |
| 12346 | JOB2 | 200 | 2008/04/02 | 2008/03/02 | 50% | 10/185 | ☐ Ready | 50% | ✓ | |
| 12347 | JOB3 | 300 | 2008/04/03 | 2008/03/03 | ✓ 100% | 0/200 | | | ⚠ | |
| 12348 | JOB4 | 50 | 2008/03/04 | 2008/03/04 | 50% | 0/50 | | | | |

? HELP    LOG OUT

JOB LIST
There are XX unreviewed jobs.
JOB NAME: [JAPANESE]    STATUS: [DRAFT SUPPLY ▽]    [🔍 SEARCH]

| JOB ID | JOB NAME | NUMBER OF PAGES | PROOFREADING DELIVERY TIME | DATE OF UPDATE | DRAFT SUPPLY | PROOFREADING | AUTHENTICATION | JOB ISSUANCE | COLOR SEPARATION | 3D VIEW |
|---|---|---|---|---|---|---|---|---|---|---|
| 12345 | JOB1 | 100 | 2008/04/01 | 2008/03/01 | 0% | Ready | ✓ | 0% | | |
| 12346 | JOB2 | 200 | 2008/04/02 | 2008/03/02 | 50% | 10/185 | ☐ Ready | 50% | | |
| 12347 | JOB3 | 300 | 2008/04/03 | 2008/03/03 | 100% | 98/200 | ✓ | 100% | △ | ✓ |
| 12348 | JOB4 | 50 | 2008/03/04 | 2008/03/04 | 50% | 0/50 | | | | |

502

[? HELP]  [LOG OUT]

PAGE LIST
JOB ID: 12345
JOB NAME: JOB3

506 — CURRENT PAGE COMPOSITION LIST | PAGE MANIPULATION — 508

PROOFREADING: OK  PROOFREADING: NG

☑ DISPLAY PROOFREADER FIELD

SELECT ALL PAGE | DESELECT PAGE

| | 1 | 2 FINISHED | 3 | 4 | 5 |
|---|---|---|---|---|---|
| | $G_1$ | $G_2$ | $G_{3-1}$ $G_{3-2}$ $G_{3-3}$ | $G_{4-1}$ $G_{4-2}$ $G_{4-3}$ $G_{4-4}$ $G_{4-5}$ | $G_5$ |
| PROOFREADER A | ✓ | ✓ | ✓ | ✓ | ✓ |
| PROOFREADER B | ✓ | ✓ | NG | ✓ | ✓ |
| PROOFREADER C | ✓ | ✓ | ✓ | ✓ | ✓ |
| PROOFREADER D | ✓ | ✓ | ✓ | ✓ | ✓ |
| | 6 | 7 | 8 | 9 FINISHED | 10 |

TO JOB DETAIL SCREEN

? HELP | LOG OUT

FIG.41

JOB LIST
There are XX unreviewed jobs.
JOB NAME: JAPANESE   STATUS: DRAFT SUPPLY ▽   [SEARCH] — 532

530

| JOB ID | JOB NAME | NUMBER OF PAGES | PROOFREADING DELIVERY TIME | DATE OF UPDATE | DRAFT SUPPLY | PROOFREADING | AUTHENTICATION | JOB ISSUANCE | COLOR SEPARATION | 3D VIEW |
|---|---|---|---|---|---|---|---|---|---|---|
| 12345 | JOB1 | 100 | 2008/04/01 | 2008/03/01 | 0% | ☐ Ready | ✓ | 0% | | |
| 12346 | JOB2 | 200 | 2008/04/02 | 2008/03/02 | 50% | 10/185 | ☐ Ready | 50% | | |
| 12347 | JOB3 | 300 | 2008/04/03 | 2008/03/03 | 100% | 98/200 | ✓ | 100% | ✓ | ✓ |
| 12348 | JOB4 | 50 | 2008/03/04 | 2008/03/04 | 50% | 0/50 | | | △ | |

[? HELP]   [LOG OUT]

FIG.42

| PAGE | PAGE 1 | PAGE 2 | PAGE 3 | PAGE 4 |
|---|---|---|---|---|
| PAGE EDITION | 1ST EDITION | 1ST EDITION | 1ST EDITION | 1ST EDITION |
| | 2ND EDITION | 2ND EDITION | | 2ND EDITION |
| | | | | 3RD EDITION |

FIG.43

| PRINTED MATERIAL EDITION | PAGE 1 | PAGE 2 | PAGE 3 | PAGE 4 |
|---|---|---|---|---|
| 1ST EDITION | 1ST EDITION | 1ST EDITION | NO PAGE DRAFT | NO PAGE DRAFT |
| 2ND EDITION | 1ST EDITION | 2ND EDITION | 1ST EDITION | NO PAGE DRAFT |
| 3RD EDITION | 2ND EDITION | 2ND EDITION | 1ST EDITION | 1ST EDITION |
| 4TH EDITION | 2ND EDITION | 2ND EDITION | 1ST EDITION | 2ND EDITION |
| 5TH EDITION | 2ND EDITION | 2ND EDITION | 1ST EDITION | 3RD EDITION |

IMAGE DISPLAY METHOD AND IMAGE DISPLAY APPARATUS, AS WELL AS PRINTING ASSISTING SYSTEM

BACKGROUND OF THE INVENTION

1. Field of the Invention

The present invention relates to an image display method and an image display apparatus, as well as a printing assisting system. More particularly, the present invention relates to an image display technique for checking finish condition of a book printed material, such as a magazine and a catalogue.

2. Description of the Related Art

For a book printed material such as a magazine and a catalogue (a catalogue book), an image of high density, such as a photograph, or the like is printed on both sides of thin paper. When both sides of thin paper are printed, printing on the back side can be seen through the front side and, depending on the degree of translucency, quality of printing can be significantly degraded if translucency exceeds an acceptable range. As such degradation of printing quality will require change of paper type and/or contents of printing, there is a demand to check finish condition before printing such a printed material.

Japanese Patent No. 3441794 discloses an image forming apparatus and an image forming method for displaying an image on the front side and a reverse image on the back side superimposed on each other on a monitor in order for a user to ensure that direction of printing of the back side with respect to the front side is as expected when performing double-sided printing by means of a so-called copier.

SUMMARY OF THE INVENTION

However, when thin paper for use for magazines and catalogue books is employed, not only printing on the back side but that on a surface positioned below (i.e., the next page) can be seen through and it is necessary to predict visibility of the next page in addition to that of the back side.

With the technique described in Japanese Patent No. 3441794, it is possible to check the positional and/or directional relationship between images on back and front sides, but it is difficult to determine the degree of visibility of the back side image and/or how much a transmissive image of the back side affects the front side image. Furthermore, Japanese Patent No. 3441794 has no disclosure about a case where continuous printing is performed on a number of pages and it is extremely difficult to check the degree of visibility among pages of a printed material that consists of multiple sheets using the technique described in Japanese Patent No. 3441794.

The present invention has been made in view of such circumstances and an object thereof is to provide an image display method and an image display apparatus as well as a printing assisting system that enable checking of translucency condition of a printed material in a state closer to reality before actual printing.

To attain the above object, in a first aspect, an image display method according to the present invention displays an image which represents contents printed on a front surface of a first recording medium and a layout of the contents on the front surface of the first recording medium, generates a transmissive image which represents an image that is printed on a front surface of a second recording medium which is laid under the first recording medium and seen through the first recording medium, and displays the transmissive image superimposed on the image printed on the front surface of the first recording medium.

According to the present invention, when creating a printed material which includes at least the first and second recording media and is formed by stacking the first and second recording media, an image printed on the front surface of the first recording medium is displayed superimposed with a transmissive image which represents an image that is printed on a front surface of a second recording medium and seen through the first recording medium. Therefore, the finish condition of the printed material can be visually checked before printing it.

A "recording medium" refers to a medium on which printing is made, including such a medium as resin sheet in addition to paper.

"Images" as called herein refer to images of a broad concept including characters, symbols, and pictograms, in addition to images of narrow definition, such as photographs and pictures.

In the image display method according to the present invention, a second aspect is preferred in which the transmissive image is generated from printing data for image which is printed on the front surface of the second recording medium.

An image display method according to a third aspect of the present invention generates a reverse transmissive image that represents an image printed on a back surface of the first recording medium and seen through the first recoding medium, and displays the reverse transmissive image superimposed on the image printed on the front surface of the first recording medium and on the transmissive image.

According to this aspect, it is possible to see how the image on the back surface of the first recording medium is seen through the front surface.

In the image display method according to the present invention, a fourth aspect is preferred in which the back surface transmissive image is generated from printing data which is printed on the back surface of the first recording medium.

A fifth aspect is preferred in which the transmissive image and the reverse transmissive image are generated based on an amount of light that reaches an observation position, and in a sixth aspect, the amount of light that reaches the observation position includes at least one of reflected light and transmitted light from the first and second recording media.

Furthermore, the amount of light that reaches the observation position may include natural light.

In an image display method according to a seventh aspect of the present invention, the amount of observed light, gl (x, y), as seen from the front surface of the first recording medium when a position on the front surface of the first recording medium is represented by x and y coordinates is expressed by:

$$gl(x,y)=lp1(x,y)+lp2(x,y)+lp3(x,y)$$

where lp1 represents lightness of reflected light from the front surface of the first recording medium, lp2 represents lightness of reflected light from the back surface of the first recording medium, and lp3 represents lightness of reflected light from the front surface of the second recording medium.

According to this aspect, a transmissive image and a reverse transmissive image can be generated based on the amount of observed light gl (x, y) as seen from the front surface of the first recording medium.

Furthermore, an eighth aspect is also preferred in which a printed material including the first recording medium and the second recording medium is three-dimensionally displayed.

The present invention also provides an apparatus invention for practicing the method invention described above. Specifically, in a ninth aspect, an image display apparatus according to the present invention comprises a display device which displays an image which represents contents printed on a front surface of a first recording medium and a layout of the contents on the front surface of the first recording medium; and a transmissive image generating device which generates a transmissive image which represents an image that is printed on a front surface of a second recording medium which is laid under the first recording medium and seen through the first recording medium, wherein the display device displays the transmissive image superimposed on the image printed on the front surface of the first recording medium.

As the image display apparatus according to the present invention, a configuration that includes a monitor device including the display device and an image generation apparatus including the transmissive image generating device may be applied, or the display device and the transmissive image generating device may be integrated.

To the image display apparatus according to a tenth aspect of the present invention, the above-mentioned image display method is preferably applied.

To attain the above object, a printing assisting system according to an eleventh aspect of the present invention comprises a server device; a terminal device connected to the server device via a network; and a printing device which is connected to the terminal device, wherein the terminal device includes: a display device which displays an image which represents contents printed on a front surface of a first recording medium and a layout of the contents on the front surface of the first recording medium based on printing data transmitted from the server device; and a transmissive image generating device which generates a transmissive image which represents an image that is printed on a front surface of a second recording medium which is laid under the first recording medium and seen through the first recording medium based on printing data transmitted from the server device, wherein the display device displays the transmissive image superimposed on the image printed on the front surface of the first recording medium.

By applying the image display method and image display apparatus to the printing assisting system according to the present invention, it is possible to check the finish condition of a printed material before entering a printing process, and if printing on the back surface or the underling surface affects printing on the front surface, measures such as change of a recording medium, printing data, or the like can be taken.

In the printing assisting system according to a twelfth aspect of the present invention, an aspect is preferred which includes a printing material creating device which creates a printed material that includes the first recording medium and the second recording medium and is printed by the printing device based on the printing data.

Furthermore, in the printing assisting system according to the present invention, an aspect is preferred in which the terminal device includes the image display apparatus according to the ninth or tenth aspect.

According to the present invention, an image printed on the front surface of the first recording medium is displayed superimposed with a transmissive image which represents an image that is printed on the front surface of the second recording medium and seen through the first recording medium when a printed material which is formed by stacking the first recording medium and the second recording medium is created. Therefore, the finish condition of the printed material can be visually checked before printing it.

BRIEF DESCRIPTION OF THE DRAWINGS

FIG. 14 shows sharing of functions between server devices;

FIG. 16 shows sharing of functions among terminal devices;

FIG. 17 shows an overall process by the workflow management system;

FIG. 21 shows a job list screen on the draft accepting terminal device;

FIG. 22 shows a job detail screen on the draft accepting terminal device;

FIG. 24 shows a job list screen on the draft accepting terminal device;

FIG. 26 shows a job list screen on the draft accepting terminal device;

FIG. 27 shows a page list screen on the draft accepting terminal device;

FIG. 29 shows a page list screen on the draft accepting terminal device;

FIG. 30 shows a login screen on a proofreading terminal device;

FIG. 31 shows a job list screen on the proofreading terminal device;

FIG. 35 shows a job list screen on the proofreading terminal device;

FIG. 36 shows a page list screen on the proofreading terminal device;

FIG. 41 shows a job list screen on a job creation/management terminal device;

FIG. 42 shows an example of edition management on a per-page basis; and

FIG. 43 illustrates edition management for a printed material that combines pages of different editions.

DETAILED DESCRIPTION OF THE PREFERRED EMBODIMENTS

Hereinafter, a preferred embodiment of the present invention will be described in detail with respect to accompanying drawings.

Overview of a Method for Displaying Finish Condition of a Printed Material

First, overview of a method for displaying finish condition of a printed material (or an image display method) according to an embodiment of the invention is provided.

Figure 1:
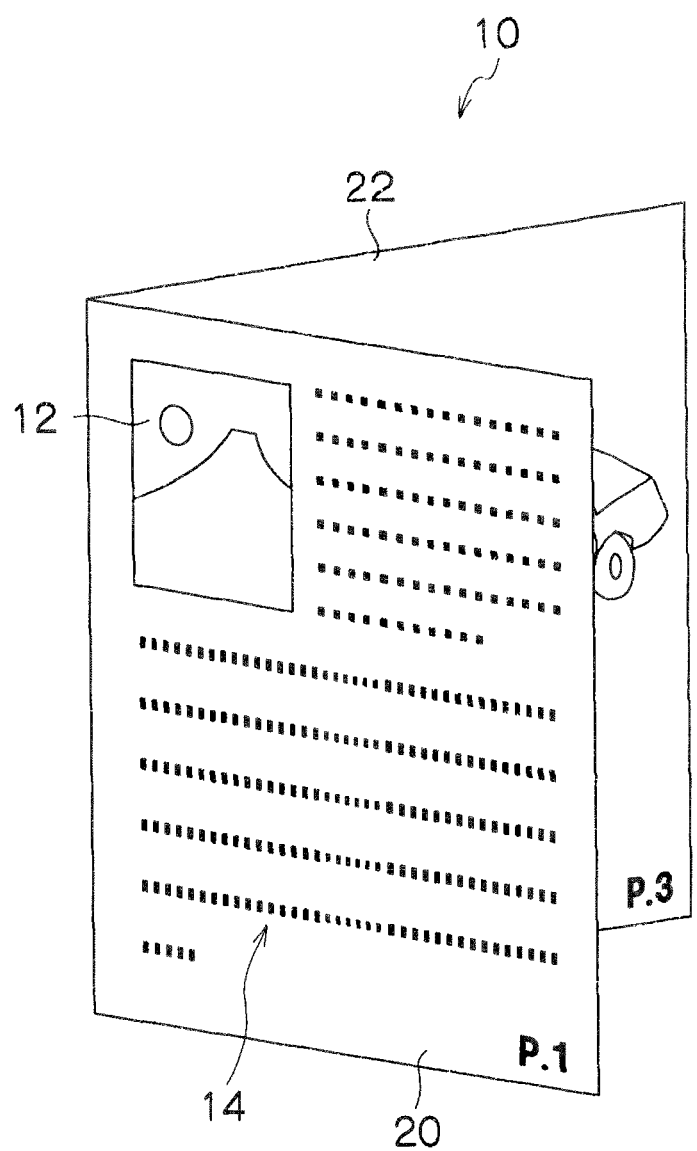
FIG. 1 is a perspective view of a book printed material.
Figure 2:
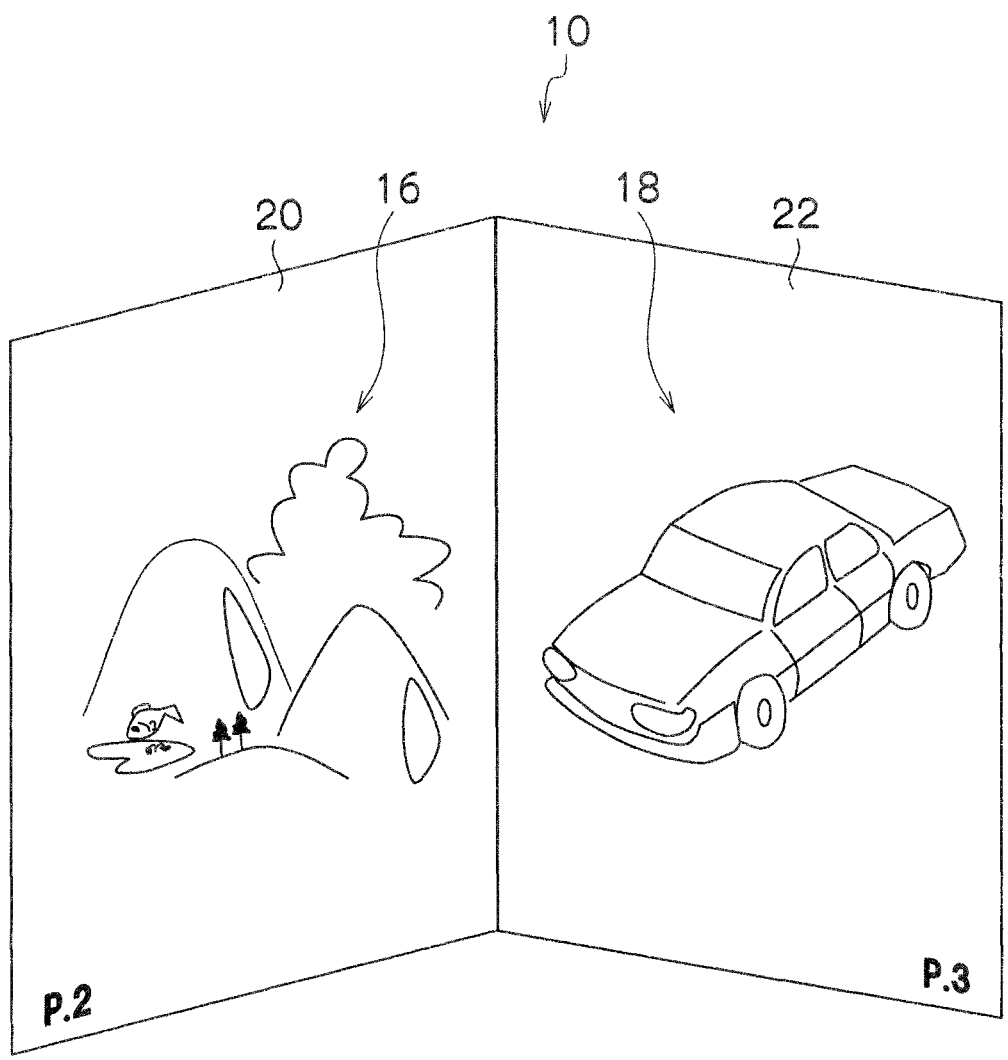
FIG. 2 shows the book printed material shown in FIG. 1 opened in a spread.

FIG. 1 is a perspective view of a book printed material 10, such as a magazine or a catalogue (or a catalogue book), and FIG. 2 shows the book printed material 10 as opened at pages 2 and 3. The book printed material 10 shown in FIGS. 1 and 2 is formed using at least two sheets of printing paper, and relatively thin printing paper, such as coated paper and high- or medium-quality paper, is adopted. "Printing paper" may also be referred to as "paper" and "a recording medium" herein.

The book printed material 10 shown in FIGS. 1 and 2 is formed by double-sided printing, where printing is done on page 2 (p. 2 in FIG. 2) which is the back side of page 1 (p. 1) and also on page 4 (not shown) which is the back side of page 3 (p. 3).

Page 1 consists of an image portion 12 and a text portion 14, where the image portion 12 is printed in multiple colors and the text portion 14 is printed in a single color (e.g., black) or two colors (e.g., black and red). Also, pages 2 and 3 shown in FIG. 2 are composed of an image portion 16 and an image portion 18 that are multicolor printed, respectively.

The printed material finish condition display method according to the present embodiment is used for checking the finish condition of the book printed material 10 when a printing draft of the book printed material 10 is completed and before it is printed. The method is for showing how much of printed matters on page 2, which is the back side of page 1, is seen through when observing page 1 of FIG. 1 as well as how much of printed matters on page 3, which is the front side of paper 22 that is positioned under paper 20 which forms pages 1 and 2, is seen through when observing page 1, by superimposing those matters over the printed matters of page 1 on a monitor device (shown at reference numeral 112 in FIG. 8).

Put differently, penetration of printing on the back side (page 2) and that of a sheet that is positioned under page 1 (i.e., page 3) are added to a preview image of a result of imposition (a preview image of page 1). Based on the result of this display, it can be determined whether penetration (or translucent visibility) of the back side image and the image on the underlying page exceeds an acceptable range or not, and if it exceeds the acceptable range, appropriate measures are taken, such as change of imposition, paper type or images.

Hereinafter, each process of the finish condition display method shown in the example is described in greater detail.

Simulation of Image Translucency

Now, description will be given on simulation of image visibility for use in generation of transmissive images on the back side and the underlying page.

The image translucency simulation to be discussed below is a method for calculating transmitted light when printing is done only in black (i.e., only a single color) with the front side p. 1 of paper 20 as the surface of observation and on the assumption that illumination light from a light source not shown is emitted only from the direction of observation.

Among light beams reflected by the front side p. 1 of paper 20, the back side p. 2 of paper 20, and the front side p. 3 of paper 22, the sum of light beams that reach the observation position for each observation direction represents an observed image (or transmitted light). This is a general method called ray tracing.

Figure 3A:
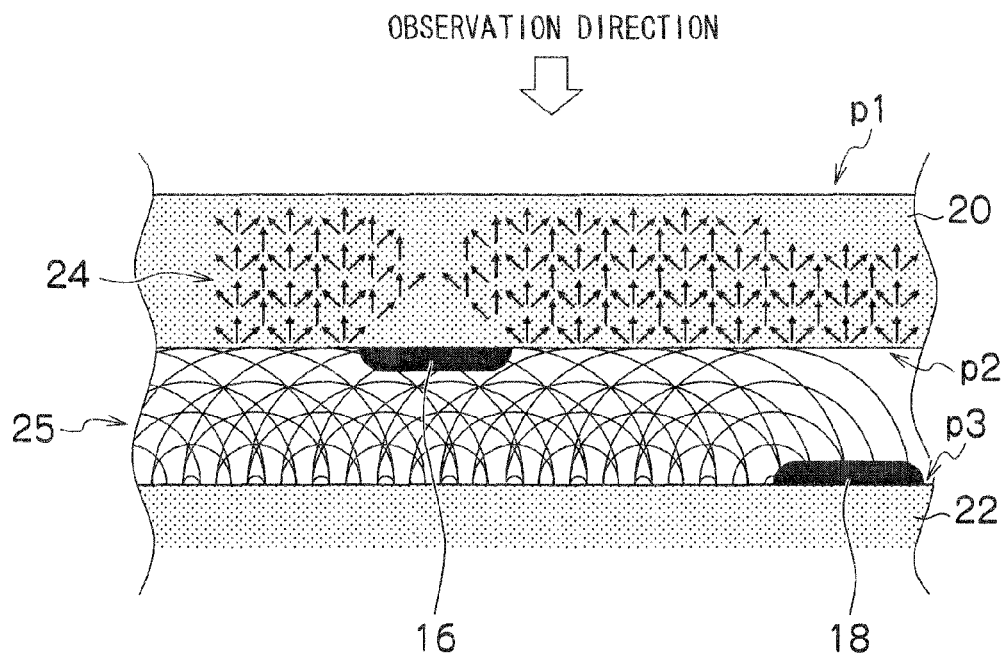
FIG. 3A and 3B illustrate simulation of image translucency.

FIG. 3A shows how the image portion 16 on the back side p. 2 of the paper 20 and the image portion 18 on front side p. 3 of paper 22 are visible on the front side p. 1 of the paper 20. FIG. 3A omits illustration of printing on the front side p. 1 of paper 20 (i.e., the image portion 12 and the text portion 14 of FIG. 1).

Representing the direction of observation with x and y coordinates on the front side p. 1 of paper 20, the amount of observed light, gl (x, y), can be expressed by Expression (1) below:

[Expression 1]

$$gl(x,y) = lp1(x,y) + lp2(x,y) + lp3(x,y) \qquad (1)$$

Lp1 (x, y) in Expression (1) corresponds to the images (the image portion 12 and text portion 14 not shown in FIG. 3) themselves on the front side p. 1 of the paper 20. When there is no printing on the front side p. 1 of paper 20, lp1 (x, y) assumes the maximum value of Lp1, and decreases as a function of light reflection factor in a printed portion when there is printing, and becomes the minimum value of 0 when reflection factor is zero (i.e., black body). The maximum value Lp1 can be determined by placing a sample of the same components as the paper 20 on approximate black body in order to measure reflected light only from the front side p. 1 of paper 20 and measuring the reflected light.

Lp2 (x, y) in Expression (1) corresponds to reflected light and diffused light from the back side p. 2 of the paper 20, which is designated by reference numeral 24 in FIG. 3. Lp2 (x, y) is a function whose parameters are light reflection factor of the back side p. 2 of the paper 20 which is associated with printing density on back side p. 2 of paper 20, as well as the light diffusion factor, thickness, light absorption factor of the paper 22, and the distance from a boundary between the image portion 16 and a non-image portion, and is uniquely determined for each paper sheet as a function of the distance from the boundary between the image portion 16 and a non-image portion and the light reflection factor of the back side p. 2 of the paper 20.

Therefore, lp2 (x, y) of Expression (1) can be fast calculated in actual operation by measuring the amount of observed light on the front side p. 1 of paper 20 that corresponds to the distance from the boundary between the image portion 16 and a non-image portion and printing density on the back side p. 2 of paper 20 in advance and storing a value obtained by subtracting the maximum value Lp1 from the amount of observed light in a table.

Lp3 (x, y) in Expression (1) corresponds to reflected light (irregularly reflected light) from the front side p. 3 of paper 22, which is designated as reference numeral 25 in FIG. 3. To determine lp3 (x, y), the amount of reflected light from the front side p. 3 of paper 22 that focuses on the back side p. 2 of paper 20 is first calculated. The subsequent process of penetrating the paper 20 and reaching the observation position is the same as that for lp2 (x, y).

Representing the amount of light that focuses on the back side p. 2 of paper 20 as lp3_lp2 (x, y), it can be expressed by Expression (2) below:

[Expression 2]

$$\text{lp3\_lp2}(x, y) = \int \frac{f(t, u)}{(t-x)^2 + (u-y)^2 + h(x, y)^2} dt du \quad (2)$$

F (t, u) in Expression (2) represents the amount of light reflection per unit area on the back side p. 3 of paper 22, corresponding to the image (the image portion 18) itself on the back side p. 3 of paper 22. Also, h (x, y) represents the amount of a gap between the back side p. 2 of paper 20 and front side p. 3 of paper 22 immediately below the observation position.

Figure 3B:
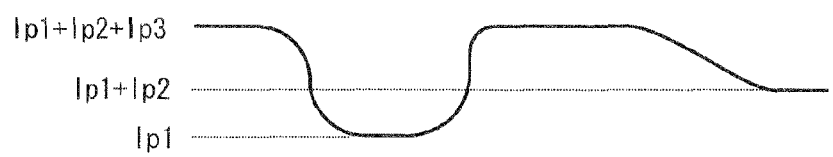

FIG. 3B schematically shows lightness determined by the calculation method described above. As shown in FIG. 3B, lightness of when both the paper 20 and paper 22 are white (i.e., a non-image portion) is: lp1+lp2+Lp3, and the lightness of image portion 16 on the back side p. 2 of paper 20 is lp1 (lp2=0, lp3=0). Also, the lightness of image portion 18 on the front side p. 3 of paper 22 is: lp1+lp2 (lp3=0).

While the present example involves three printed pages, i.e., the front side p. 1 of paper 20, back side p. 2 of paper 20, and front side p. 3 of paper 22, it is also possible to superimpose a transmissive image of a printed image on the back side p. 4 of paper 22 and/or the front and back sides of paper that is laid further under the paper 22.

In addition, while the present example describes a case where light is emitted only from one direction, when light is emitted from a number of directions, the amount of observed light can be calculated by summing the results for the individual directions according to the above-described method. Also, for printing in multiple colors having different spectral reflection factors, a reproduced color can be calculated by calculation for each spectral component.

That is to say, a transmissive image and a reverse transmissive image can be generated based on the amount of light that reaches the observation position. While the above description shows a method of calculating the amount of observed light based on reflected light amount for the sake of simplicity, observed light amount may include the amount of transmitted light in addition to the amount of reflected light. For example, when a light source is positioned at the opposite side of paper at the observation position, the amount of transmitted light mainly contributes.

In other words, the amount of observed light g(x, y) in Expression (1) may be replaced with the amount of light that reaches the observation position out of reflected light amount and transmitted light amount as required.

When the amount of light that reaches the observation position includes transmitted light, the amount of light can be calculated using Expression (1) on the assumption that the transmitted light is reflected light from a transmission surface (i.e., the surface on the opposite side of the light source, or the surface corresponding to the reflecting surface in the case of reflected light).

That is to say, the "reflecting surface" for reflected light and the "transmission surface" for transmitted light function as surfaces that emit light (or light emitting surfaces), and the amount of light that reaches the observation position out of light emitted from the light emitting surfaces may be determined according to Expression (1). The amount of observed light, g(x, y), determined with Expression (1) is a concept that includes natural light and the like in addition to reflected light and transmitted light.

Figure 4:
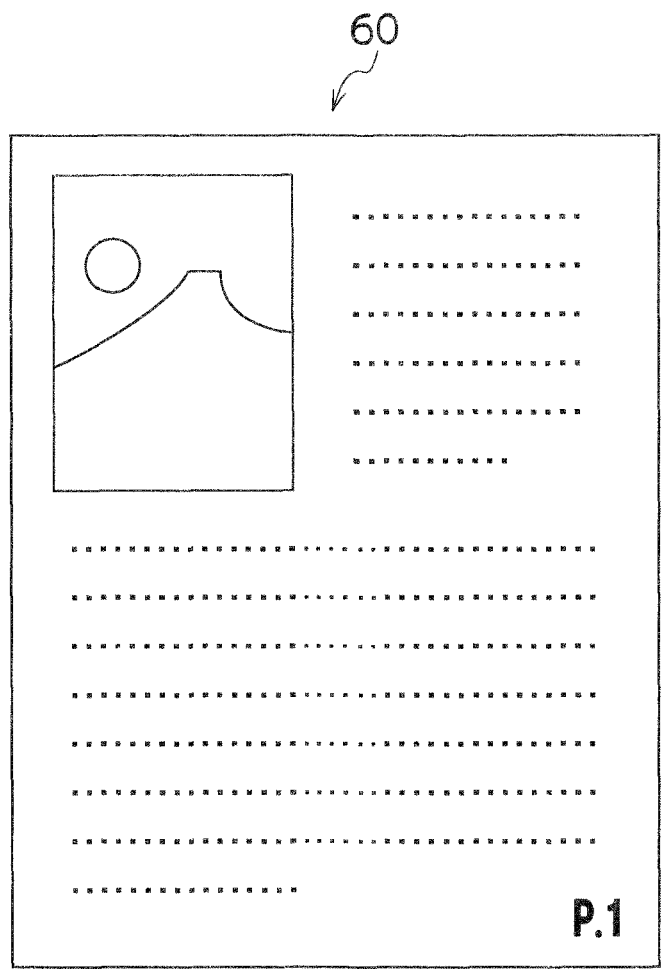
FIG. 4 illustrates a preview image.

FIG. 4 shows a preview image 60 of an observation target page (page 1). The preview image 60 of the observation target page is generated based on printing data for the observation target page.

Figure 5:
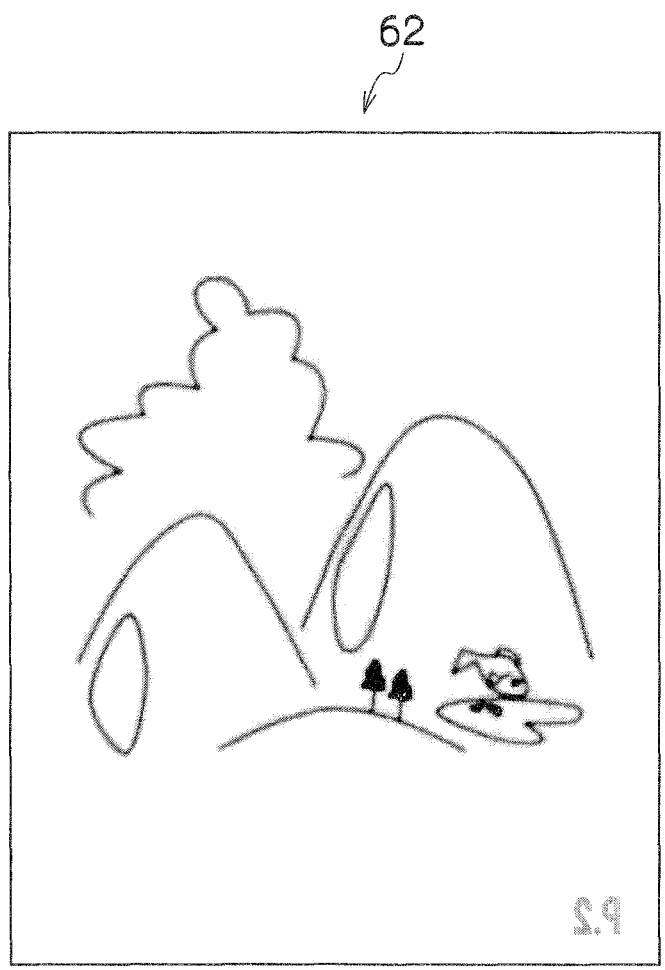
FIG. 5 illustrates a reverse transmissive image.

FIG. 5 shows a reverse transmissive image 62 on the back side (page 2) of the observation target page. A reverse image is generated based on printing data for the back side of the observation target page, and the reverse transmissive image 62 is further generated with respect to the reverse image based on the lightness of the image portion 16.

Figure 6:
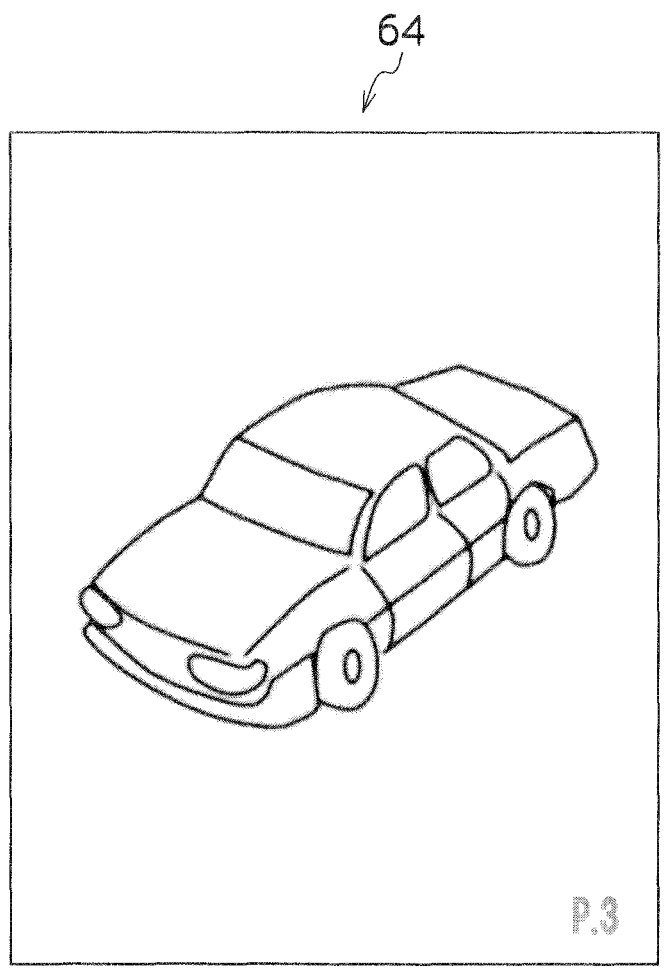
FIG. 6 illustrates a transmissive image.

FIG. 6 shows a transmissive image 64 on the page (page 3) that is positioned under the observation target page. The transmissive image 64 is generated based on printing data for a page that is laid under the observation target page and the lightness of the image portion 18.

Figure 7:
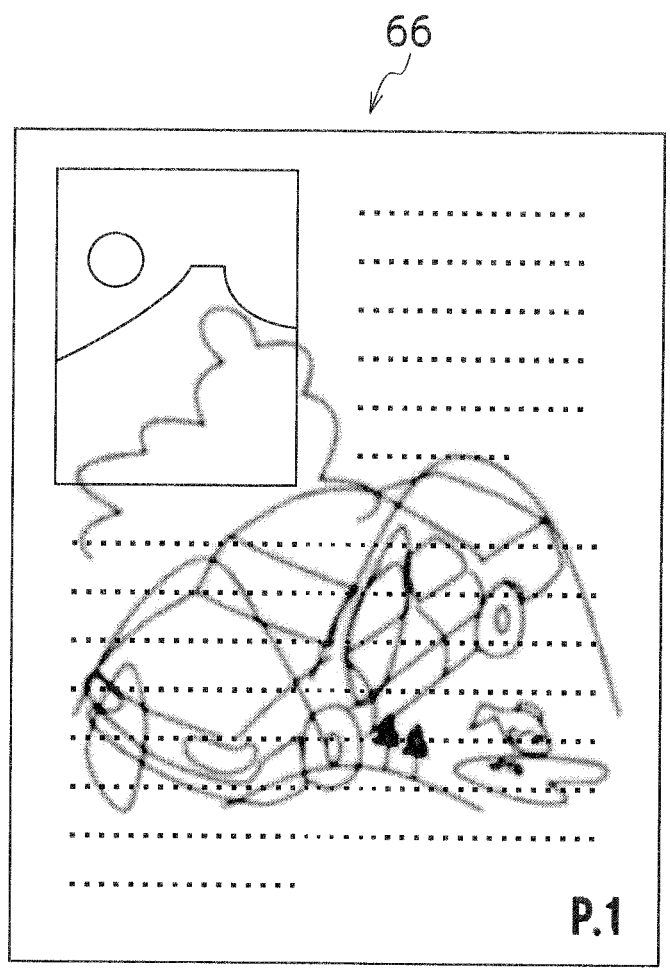
FIG. 7 illustrates a screen for confirming finish condition.

FIG. 7 shows a finish condition confirmation image 66 (or finish condition checking display) which displays the preview image 60 of the observation target page superimposed with the reverse transmissive image 62 and the transmissive image 64. With this finish condition confirmation image 66, the finish condition of the book printed material (see FIG. 1) can be checked before a printing process is entered. Especially when thin paper is used such as for a magazine or a catalogue book, printing on the back side and/or printing on a page that is positioned below may negatively affect printing on the front side, and in such a case, appropriate measures are taken such as change of the layout on the page, page layout, or the paper type of affected pages.

While the present example illustrates double-sided printing, the process of generating a reverse transmissive image is omitted in a case of single-side printing.

Exemplary System Configuration

Now, a printing material finish condition display system for realizing the printed material finish condition display method described above will be described.

Figure 8:
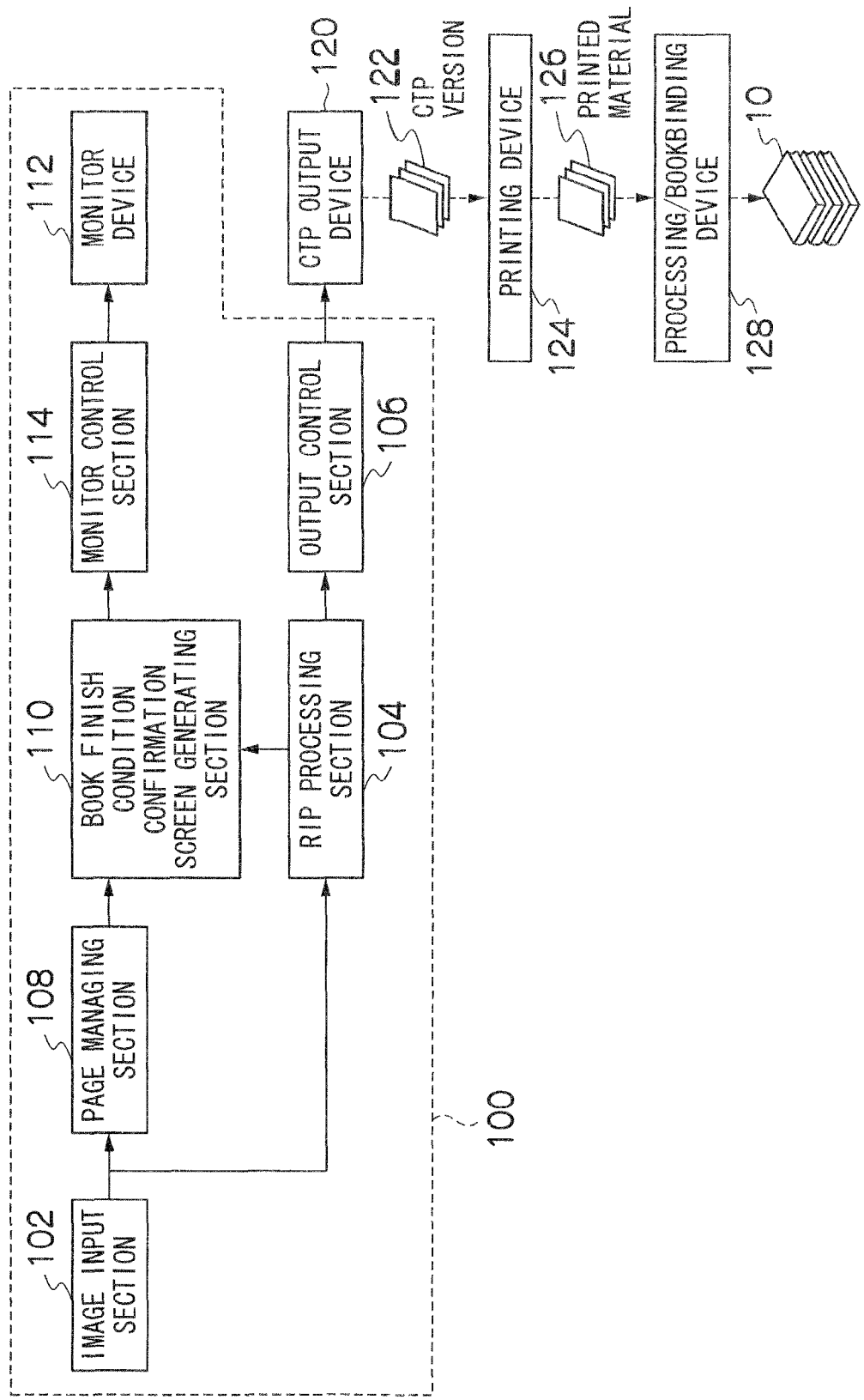
FIG. 8 is a block diagram showing a schematic configuration of an image display apparatus according to an embodiment of the present invention.

FIG. 8 is a block diagram showing a general configuration of a printed material finish condition display system according to the present invention. The printed material finish condition display system may sometimes be referred to just as a "display system".

As shown in FIG. 8, a display system 100 includes an image input section 102 which includes an input interface for inputting printing data (or image data) which has been proof-read and memory for temporarily storing input image data; an RIP processing section 104 which applies Raster Image Processor (RIP) processing to input image data to convert it to output data and temporarily stores output data after RIP process; an output control section 106 which has an output interface and controls output of output data after RIP process; a page managing section 108 which obtains page information included in input image data and manages the page information; a book finish condition confirmation image generating section 10 which generates the finish condition confirmation image 66 of FIG. 7 based on output data after RIP processing and page management information and stores the finish condition confirmation image 66; and a monitor control section 114 which converts data of the finish condition confirmation image 66 stored in the book finish condition confirmation image generating section 110 to a display format for a monitor device 112.

The display system 100 shown in FIG. 8 may be composed of the monitor device 112 and a finish condition confirmation image generation apparatus that includes the image input section 102, RIP processing section 104, output control section 106, page managing section 108, book finish condition confirmation image generating section 110 and monitor control section 114, or the confirmation image generating apparatus and the monitor device 112 may be integrated.

The finish condition of the book printed material is checked on the finish condition confirmation image 66 shown on the monitor device 112, and if the visibility of the back side or the underlying page is within an acceptable range, output data stored in the RIP processing section 104 is sent to the next process via the output control section 106.

FIG. 8 shows an example of processes that follow the finish condition confirmation process according to the display system 100. The following processes may include a CTP output process to create a CTP version 122 with a Computer To Plate (CTP) output device 120, a printing process to create a printed material 126 on a printing device 124 using the CTP version 122 created by the CTP output device 120, and cutting, sorting, and bookbinding processes on a processing/bookbinding device 128. Through such processes, the book printed material 10 is finished.

With the printed material finish condition display method and display system (or display apparatus) configured as described above, by displaying the preview image as a result of imposing a book printed material (see FIG. 4) superimposed with a reverse transmissive image on its back side (see FIG. 5) and a transmissive image (see FIG. 6) on the page positioned below (see FIG. 7), it is possible to check the finish condition (i.e., the degree of visibility of an image on the back side or the underlying page) before printing and determine whether or not the image on the back side or the underlying page adversely affects the image on the front side.

If the image on the back side or the underlying page adversely affects the front side image, finished quality can be improved by changing sheet layout, page layout, paper type, or the like.

The present invention exerts its effect especially for printing of a magazine or a catalogue (a catalogue magazine) which consists of a large number of pages and is made by printing color images on thin paper.

An aspect is preferred that has a switching device which switches between normal display mode in which only the preview image 60 (see FIG. 4) of the observation target page is displayed and finish condition confirmation image display mode in which the reverse transmissive image 62 on the back side (see FIG. 5) and the transmissive image 64 (see FIG. 6) on the underling page are superimposed on the preview image. It is more preferable that such an aspect has reverse transmissive image mode to display only the reverse transmissive image 62 and/or transmissive image mode to display only the transmissive image 64 and permits selective switching between those display modes. Furthermore, it may have a mode to display the preview image 60 superimposed with only the reverse transmissive image 62 and/or a mode to display the preview image 60 superimposed with only the transmissive image 64.

Furthermore, individual processes of the printed material finish condition display method described above (i.e., functions of a display apparatus) may also be configured as a program which is realized by a computer. That is to say, it is also possible to construct a program that includes a function of generating a preview image of the observation target page (or surface), a function of generating a reverse transmissive image on the back side of the observation target page, a function of generating a transmissive image on a page that is laid under the observation target page, and a function of displaying the preview image superimposed with the reverse transmissive image and the transmissive image.

Description on 3D Display Mode

Now, 3D display mode which is applied to the present example will be described.

The printed material finish condition display method has 3D display function of displaying the book printed material 10 in a three-dimensional manner on the monitor device 112 (see FIG. 8).

In the 3D display mode, the finish condition of the book printed material 10 can be three-dimensionally displayed (or 3D display). Furthermore, by performing an operation of turning pages of the book printed material 10 on the screen using a user interface such as a mouse, a motion of turning pages of the book printed material 10 shown on the screen can be displayed.

Figure 9:
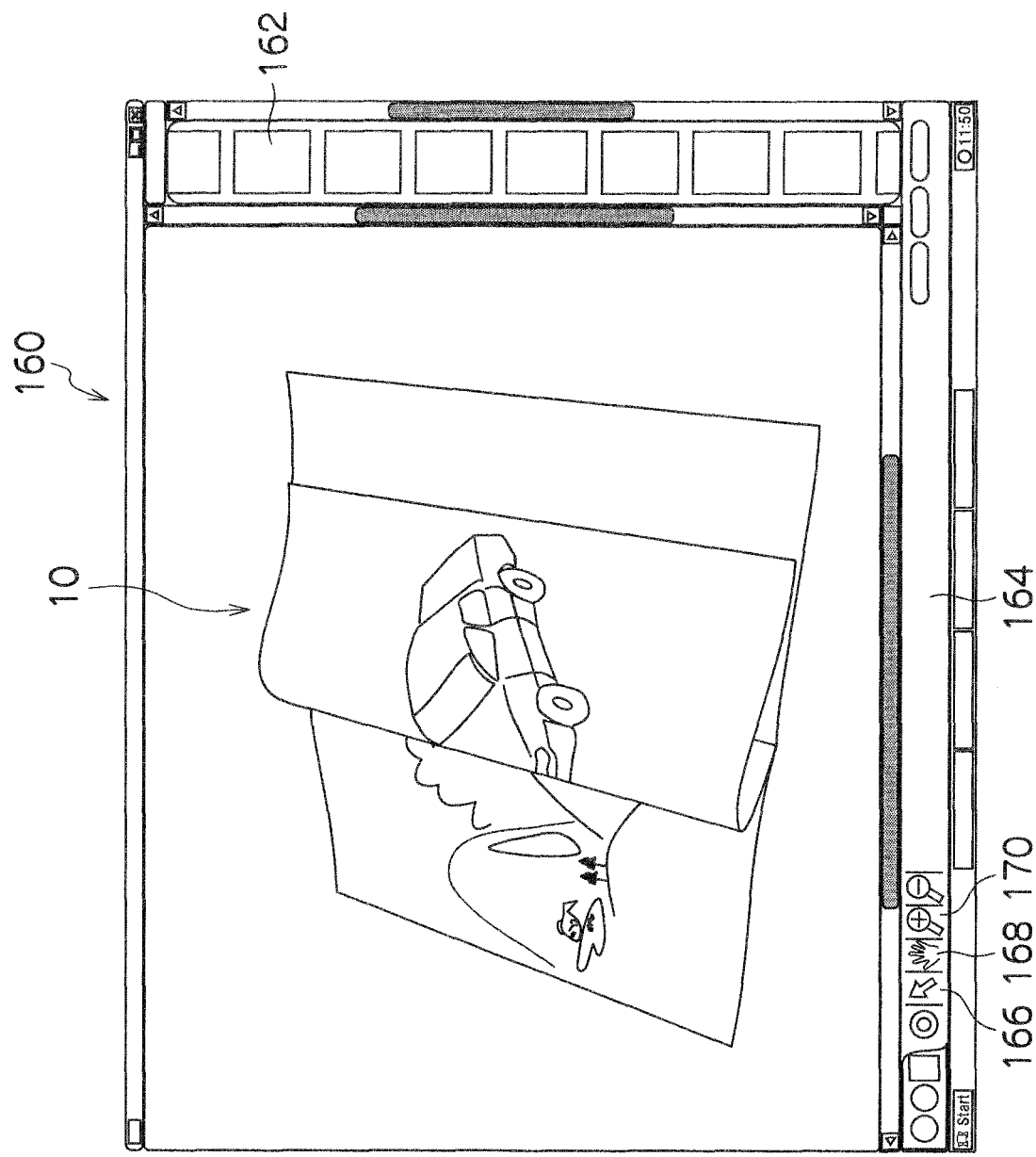
FIG. 9 illustrates 3D display mode.

FIG. 9 is a conceptual view for illustrating the 3D display mode, showing a 3D display screen 160 on which the book printed material 10 is displayed in a three-dimensional manner. When the 3D display mode is selected on a mode switching screen not shown, screen display on the monitor device 112 changes to the 3D display screen 160 shown in FIG. 9.

On the 3D display screen 160 shown in FIG. 9, a preview list 162 of pages of the book printed material 10 is shown on the right end of the screen and a tool bar 164 is displayed at the bottom of the screen. The preview list 162 lists all pages that constitute the book printed material 10 starting from the first page from top to bottom of the screen.

When one of the pages is selected from the preview list 162 using a mouse or a keyboard, the selected page is displayed as a spread over two pages in the center of the screen.

On the tool bar 164, icons of tools that can be used in the 3D display mode are shown. Available tools include a selection tool (or an arrow tool) 166, a page turning tool 168 (a palm icon), and zoom in/out tool 170 (a magnifier icon).

To perform an operation of turning the currently displayed page, the page turning tool 168 is selected from the tool bar 164, and an operation of turning the page of the book printed material 10 is performed on the screen by operating a mouse (when a pointer is moved from right to left in FIG. 9 while keeping a portion of the target page clicked). In response to operation of the mouse, a motion of the page of the book printed material 10 on the screen being turning is displayed to open and show the following pages.

While FIG. 9 shows display of a preview image of a selected page (and the preceding or following page), a reverse transmissive image on the back side and/or a transmissive image on the underlying page, which were described earlier, may also be superimposed on the preview image in the 3D display mode. That is to say, when a display switching button (not shown) displayed on the 3D display screen 160 of FIG. 9 is clicked, a reverse transmissive image and a transmissive image are displayed being superimposed on the preview image.

A reverse transmissive image and a transmissive image in the 3D display mode are derived by a calculation formula which adds components at a position corresponding to the amount of lift associated with a page turning operation to the calculation method for the planar display described above.

Figure 10:
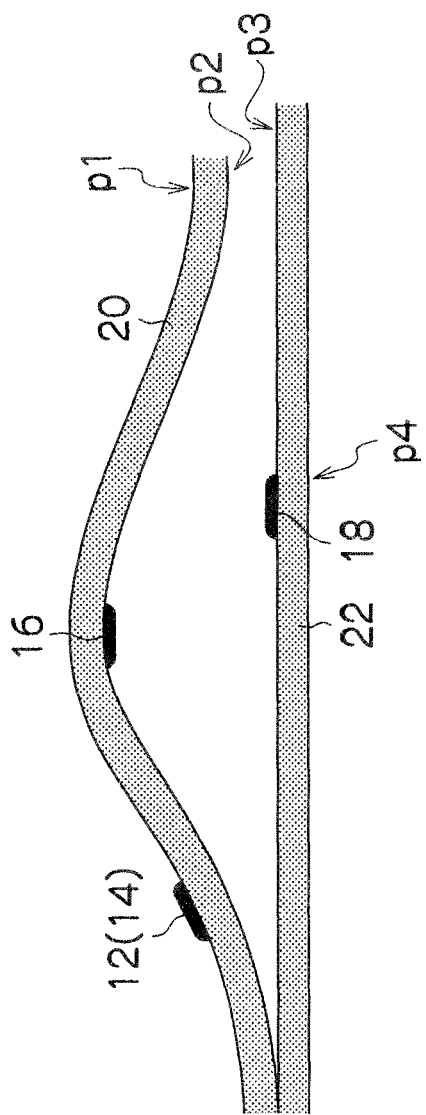
FIG. 10 conceptually illustrates 3D display mode.

FIG. 10 is a conceptual view of a cross-sectional shape of the book printed material 10 in the 3D display mode, schematically showing a selected page being turned (the condition shown in FIG. 9). In FIG. 10, elements the same as or similar to those of FIG. 3A are given the same reference numerals and description thereof is omitted.

The paper 20 shown in FIG. 10 is the page that is being turned, having an upward convex shape with its approximate center as the vertex. The image portion 12 (text portion 14) on the front side p. 1 of paper 20 is inclined in accordance with curvature of the paper 20, and the image portion 16 on the back side p. 2 of paper 20 is positioned in the vicinity of the vertex of the curved shape of paper 20. The paper 20 moves with proceed of the page turning operation, and components at the position corresponding to the amount of lift varies.

The reverse transmissive image of the back side p. 2 of paper 20 and a transmissive image of front side p. 3 of paper 22 in the 3D display mode can be generated using a similar method to that for the planar display described above using FIGS. 3A and b. When a page turning operation is performed in the 3D display mode, it is important processing when combined with 3D display mode that the image on the underlying page is stationary while the image on the page being turned moves.

In other words, by generating a reverse transmissive image and a transmissive image in response to the movement of the page being turned and displaying those images in sequence, the reverse transmissive image and the transmissive image are displayed being superimposed on the preview image in the 3D display mode.

In the 3D display mode (or function) configured as described above, the finish condition of the book printed material 10 can be displayed in a state closer to reality.

Applications

The printed material finish condition display method described above is applicable as a function of a workflow management system (or a printing assisting system) described below. Next, as an application of the printed material finish condition display method described above, an application to the printing assisting system will be shown.

Overall Configuration of the Workflow Management System

Figure 11:
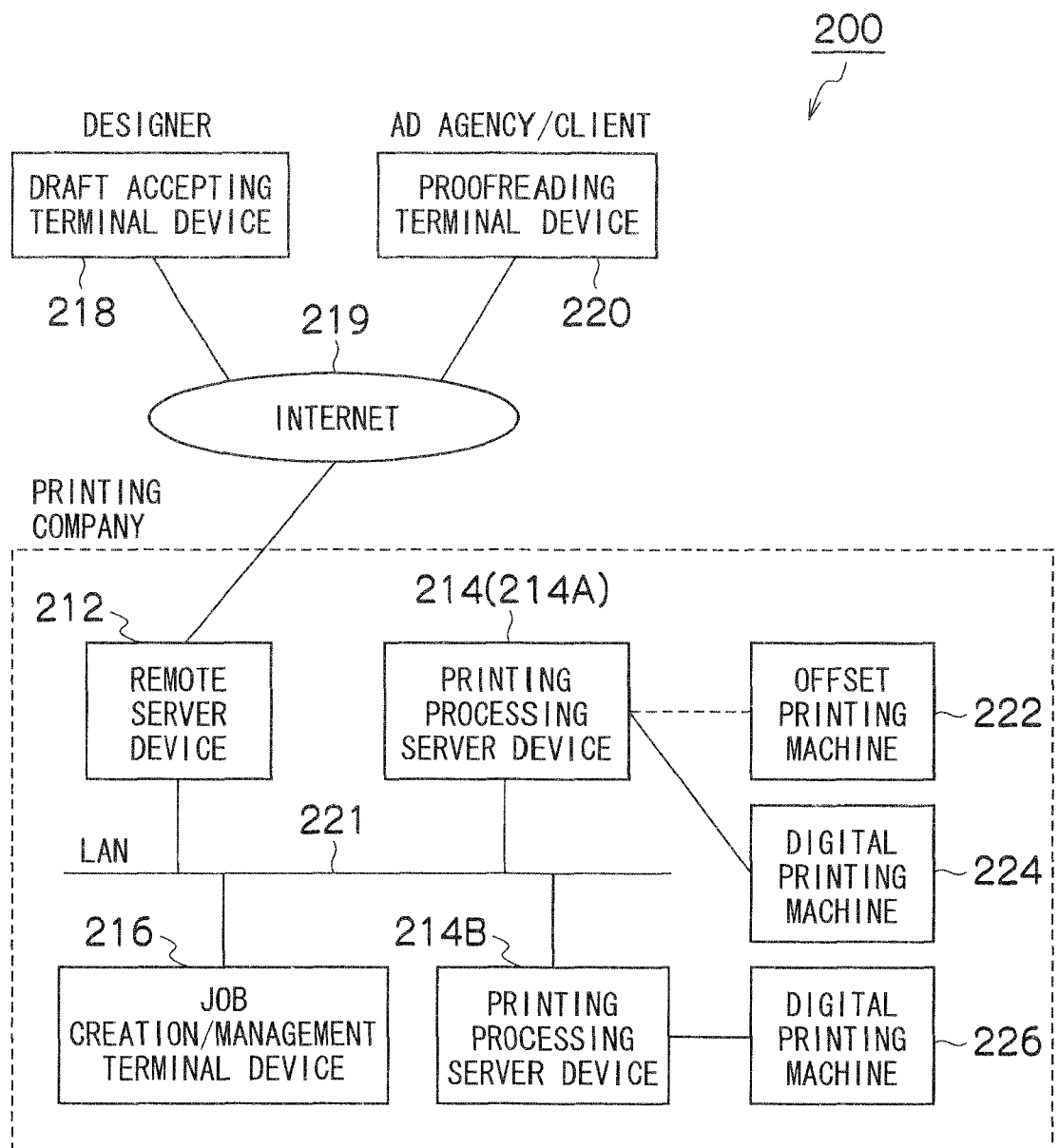
FIG. 11 shows an overall configuration of a workflow management system according to an application of the present invention.

A workflow management system 200 shown in FIG. 11 is mainly composed of a remote server device 212, a plurality of printing processing server devices 214 (214A and 214B), a job creation/management terminal device 216, a draft accepting terminal device 218, and a proofreading terminal device 220. The remote server device 212, printing processing server device 214, and job creation/management terminal device 216 may be placed in a printing company, for example, and the draft accepting terminal device 218 at an office to which designers belong, and the proofreading terminal device 220 at an advertisement agency or a client (a company). However, the present invention is not limited to the present example, of course.

The remote server device 212 is a device that serves as the core of the workflow management system of the present invention, being connected to the draft accepting terminal device 218 and proofreading terminal device 220 via the Internet 219 and also to the printing processing server devices 214A, 214B, and the job creation/management terminal device 216 via a LAN (or a WAN) 221.

The printing processing server devices 214A and 214B are each provided corresponding to one or more printing machines. In the example shown in FIG. 11, the printing processing server device 214A corresponds to an offset printing machine 222 and a digital printing machine 224, and the printing processing server device 214B corresponds to a digital printing machine 226. After printing jobs are registered to the printing processing server devices 214A and 214B, printing operations are carried out either online or offline on corresponding printing machines. The digital printing machines 224 and 226 are connected online to the printing processing server devices 214A and 214B, respectively.

Figure 12:
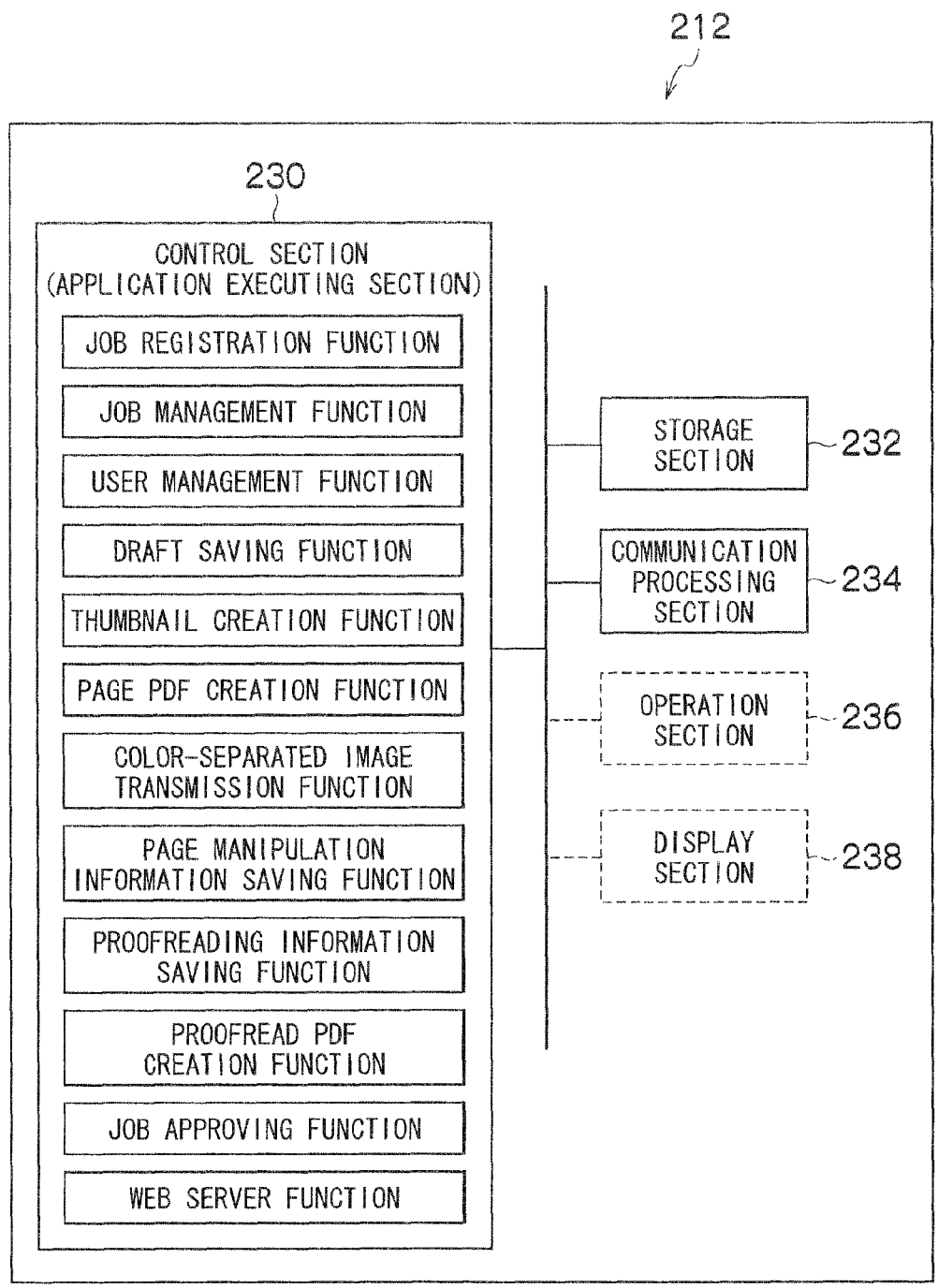
FIG. 12 is a block diagram showing a configuration of a remote server device.
Figure 13:
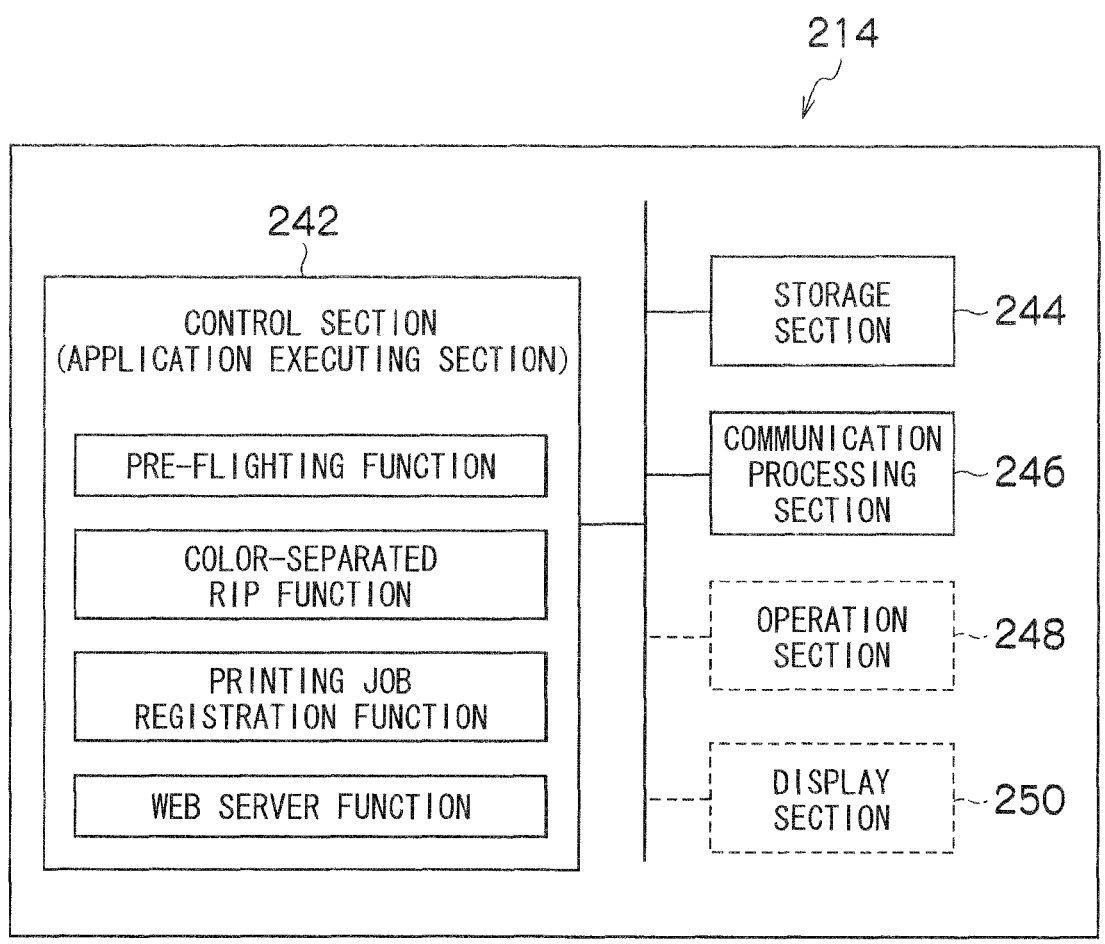
FIG. 13 is a block diagram showing a configuration of a printing processing server device.

Next, with reference to FIGS. 12 to 14, functions of the server devices are described.

FIG. 12 is a block diagram showing a configuration of the remote server device 212 shown in FIG. 11. As shown in FIG. 12, the remote server device 212 mainly includes a control section 230, a storage section 232, and a communication processing section 234. The remote server device 212 is actually realized by incorporating dedicated software into a computer that functions as a Web server or a database server.

The control section 230 corresponds to a CPU and is an application executing section to execute an application (or a program) stored in the storage section 232. The control section 230 realizes functions of job registration, job management, user management, draft saving, and various other functions.

The storage section 232 corresponds to an external storage device (e.g., a hard disk) and/or a primary storage device (e.g., RAM), and saves applications to be executed by the control section 230 and/or various data information, such as PDF drafts passed from the draft accepting terminal device 218.

The communication processing section 234 is an interface section that performs communication processing with the draft accepting terminal device 218 and proofreading terminal device 220 via the Internet 219, and/or an interface section that performs communication processing with the printing processing server device 214 or the job creation/management terminal device 216 via the LAN 221.

In this application, the job creation/management terminal device 216 has server management functions as mentioned later, and various settings, management or the like for the remote server device 212 is made from the job creation/management terminal device 216. The remote server device 212 may be provided with an operation section 236 and/or a display section 238 and various settings, management or the like may be performed directly on the remote server device 212.

FIG. 13 is a block diagram showing a configuration of the printing processing server device 214 shown in FIG. 11. As shown in FIG. 13, the printing processing server device 214 has a similar configuration to that of the remote server device 212 described above, mainly composed of a control section 242, a storage section 244, and a communication processing section 246. The printing processing server device 214 is actually realized by incorporating dedicated software into a computer that functions as a Web server or a database server.

The control section 242 corresponds to a CPU and is an application executing section to execute applications (or programs) stored in the storage section 244, realizing pre-flighting, color-separation RIP, and various other functions.

The storage section 244 corresponds to an external storage device (e.g., a hard disk) and/or a primary storage device (e.g., RAM), in which applications to be executed by the control section 242, and/or various data information such as PDF drafts sent from the remote server device 212 are saved (or primarily saved).

The communication processing section 246 may be an interface section that performs communication processing with the printing processing server device 214 and/or the job creation/management terminal device 216 via a LAN, or an interface section that performs communication processing with a printing machine provided for the printing processing server device 214.

While in this application various settings and management for the printing processing server device 214 are made from the job creation/management terminal device 216 as with the remote server device 212, an operation section 248 and/or a display section 250 may be provided on the printing processing server device 214 and various settings or management may be carried out directly on the printing processing server device 214.

FIG. 14 shows sharing of functions between the server devices 212 and 214.

As shown in FIG. 14, both the server devices 212 and 214 have Web server functions. For example, when a login is made from any of the terminal devices 216, 218 and 220 to the remote server device 212, the Web server function provides a login screen to the terminal device.

The remote server device 212 has a function of registering jobs (a job registration function), and/or a function of managing progress of a job registered through the job registration function (a job management function). As mentioned above, a job consists of one or more operations or tasks and represents a series of processes of producing one printed material. A job created on a terminal device having job creation function (the job creation/management terminal device 216) is saved in the storage section 232 of the remote server device 212.

The remote server device 212 also has functions of setting and managing access authority of concerned parties that produce a printed material in cooperation (e.g., a designer, ad agency, client, printing company) for each job (user management function), and persons who operate the terminal devices 216, 218 and 220 are permitted to operate within the range of their access authority that has been set through the user management function.

The remote server device 212 further has a function of saving a PDF draft supplied from a draft provider (e.g., a designer) (a draft saving function), a function of creating a thumbnail and a page PDF in order to display a page thumbnail (or a scaled-down page) for page manipulation on a terminal device side after pre-flighting and color-separation RIP are performed on the printing processing server device 214 as mentioned below (thumbnail creation function and page PDF creation function), a function of saving information on history of page manipulation on a terminal device side (a page manipulation information saving function), and various other functions (color-separated image transmission, proofreading information saving, proofread PDF creation, and job approving functions). A draft (a PDF draft) passed from a terminal device having draft transmission function (i.e., the draft accepting terminal device 218), and/or history of proofreading on a terminal device having proofreading function (i.e., the proofreading terminal device 220) are saved in the storage section 232 of the remote server device 212.

The printing processing server device 214 has a function of carrying out pre-flighting process for determining whether a PDF draft passed to the remote server device 212 is data suited for printing or not (e.g., whether a designated font is usable in the present system or not) (a pre-flighting function), and/or a function of converting (raster conversion) an image of R (red), G (green) and B (blue) included in a PDF draft to a bitmap being color-separated into images of C (cyan), M (magenta), Y (yellow), and K (black) suited for printing (color-separated RIP function). The printing processing server device 214 also has a function of registering printing jobs to a corresponding printing machine (a printing job registration function).

While in the configuration illustrated here the functions shown in FIG. 14 are shared by two server devices (the remote server device 212 and the printing processing server device 214) as an example, the present invention is not specifically limited thereto, all the functions may be realized on one server or the functions may be shared among three or more server devices.

Next, referring to FIGS. 15 and 16, functions of the terminal devices will be described.

Figure 15:
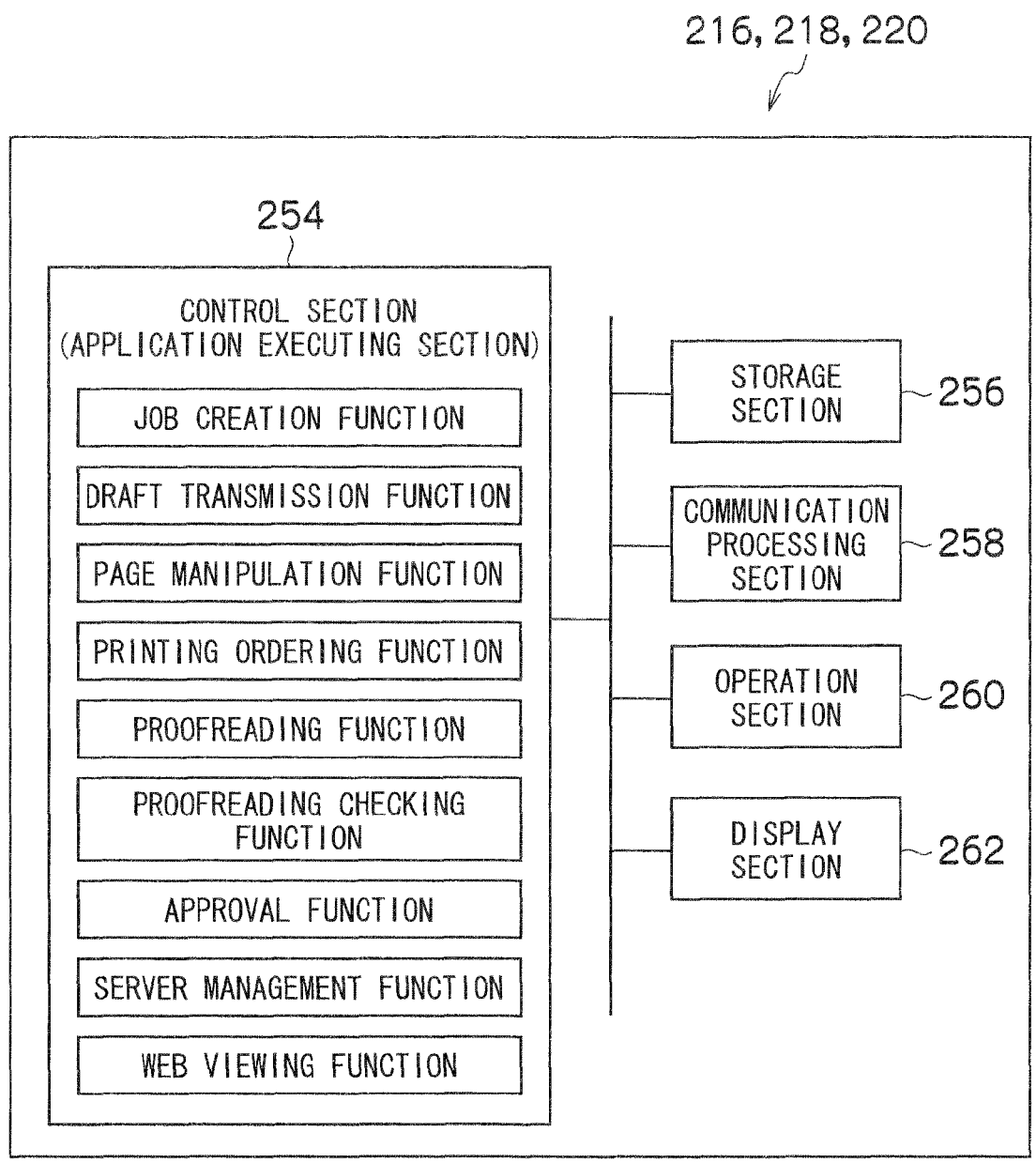
FIG. 15 is a block diagram showing a configuration of each terminal device.

FIG. 15 is a block diagram showing a configuration of the terminal devices 216, 218 and 220 shown in FIG. 11. For convenience of description, FIG. 15 shows functions shared by the terminal devices 216, 218 and 220 together.

As shown in FIG. 15, each of the terminal devices 216, 218 and 220 is mainly composed of a control section 254, a storage section 256, a communication processing section 258, an operation section 260, and a display section 262. In reality, the terminal devices 216, 218 and 220 are each realized by a generic personal computer with Web browser software incorporated therein.

The control section 254 corresponds to a CPU, and is an application executing section for executing applications (programs) stored in the storage section 256, realizing job creation, draft transmission, page manipulation, and various other functions.

The storage section 256 corresponds to an external storage device (e.g., a hard disk) and/or a primary storage device (e.g., RAM), in which applications to be executed by the control section 254 and/or a PDF draft for transmission to the remote server device 212 are saved. A thumbnail PDF transmitted from the remote server device 212 or the like is also saved in the storage section 256 as mentioned later.

Applications (terminal programs) saved in the storage section 256 are programs written in Java (a registered trademark) language, for example. Such a terminal program is downloaded (or installed) from the remote server device 212 to a terminal device via the Internet 219 after login is made to the remote server device 212 by utilizing Web viewing function of the terminal devices 216, 218 and 220. A terminal program may also be directly installed to a terminal device utilizing an external storage medium without passing through the Internet 219.

As terminal programs, different programs may be used in accordance with uses of terminals or a common program may be used on all terminal devices. In the former case, operations for upgrading the program can be kept to the required minimum range and convenience for users is improved. In the latter case, such an aspect is preferred that permits selective enabling and disabling of functions in accordance with user information managed on the remote server device 212, which can reduce cost by making a terminal program common.

The communication processing section 258 is an interface section that performs communication processing with the remote server device 212 via the Internet 219 or the LAN 221.

The operation section 260 corresponds to a keyboard or a mouse, and functions as an operation device for operating various files, commands, or the like on the display screen of the display section 262 to be discussed below.

The display section 262 corresponds to a monitor, and functions as a device for displaying various screens (GUIs) provided by an application stored in the storage section 256.

FIG. 16 shows sharing of functions among the terminal devices 216, 218 and 220.

As shown in FIG. 16, the terminal devices 216, 218 and 220 have a function for viewing a Web page published by the remote server device 212, and various operations become possible within the range of one's access authority established on the remote server device 212 by entering a login ID and a password on a login screen provided by the remote server device 212.

The draft accepting terminal device 218 has a function of transmitting a PDF draft to the remote server device 212 (a draft transmission function), a function of manipulating pages of a draft saved on the remote server device 212 (a page manipulation function), and a function of checking a result of proofreading by a proofreader (an ad agency or a client) (a proofreading checking function).

The proofreading terminal device 220 has a function of proofreading a PDF draft passed to the remote server device 212, and a function of approving completion of a proofreading task (an approval function). The proofreading function includes functions of color-separated image composition, testing image creation, and proofreading information generation.

The job creation/management terminal device 216 has a function of creating a job (a job creation function), a function of ordering the printing processing server device 214 on printing via the remote server device 212 after approval by a proofreader (an agency or a client) (a printing ordering function), and a function of making various settings or management for the server devices 212 and 214 (a server managing function). The job creation function includes a function of changing or canceling a job already registered to the remote server device 212 and/or a function of setting or changing access authority of involved parties who cooperate to produce a printed material (e.g., a designer, an ad agency, a client, and a printing company).

While functions are shared among the draft accepting terminal device 218, proofreading terminal device 220, and job creation/management terminal device 216 in this application as shown in FIG. 16, the present invention is not specifically limited thereto and how to share functions may be determined in accordance with use of terminals. For example, functions of the draft accepting terminal device 218 and proofreading terminal device 220 may be integrated into and realized by one terminal device (a draft accepting/proofreading terminal device). When a job creator is a person not from a printing company (e.g., one from an ad agency), the functions of the job creation/management terminal device 216 may be divided between two terminal devices (a job creation terminal device and a management terminal device), and the job creation terminal device may be configured to connect to the remote server device 212 via the Internet 219.

Description of a Workflow

Now, referring to FIG. 17, an overall process (a workflow) by the workflow management system 200 will be described. It is assumed here as an example that a job creator (a printing company) creates a job, a person in charge of creation and supply of a draft (a designer) supplies a PDF draft, a proofreader (an ad agency or a client) proofreads the draft, resupply and proofreading of the draft are repeated until a proofreading task is completed, and the proofreader (an ad agency or a client) approves the draft and then a person in charge of printing ordering (a printing company) orders printing.

(Job Creating Process)

First, a job creator (a printing company) logs into the remote server device 212 from the job creation/management terminal device 216, and then creates a job relating to creation of a requested printed material utilizing the job creation function of the job creation/management terminal device 216 (step S10). As mentioned above, a job consists of one or more operations or tasks, representing a series of processes for producing one printed material. At this point, the job creator also designates parties who will produce the printed material in cooperation (a designer, ad agency, client, and printing company) (setting of access authority). After the job is thus created on the job creation/management terminal device 216, the result is provided to the remote server device 212, on which the job is registered (step S12). At the same time, access authority of each of the parties is set. Although not shown, when the job is registered to the remote server device 212, all (or some) of the parties involved in the registered job may be notified of registration of the job such as by electronic mail.

(Draft Supply Process)

Figure 18:
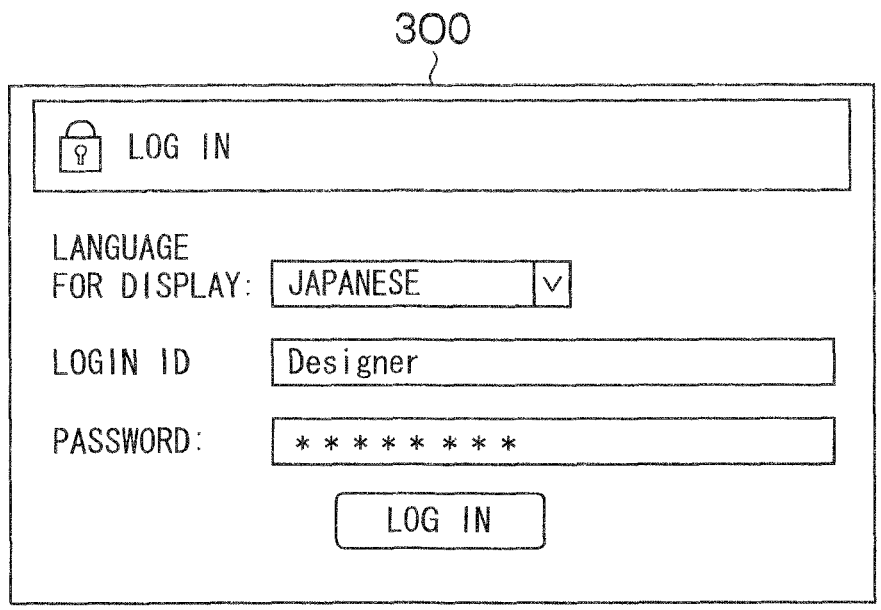
FIG. 18 shows a login screen on a draft accepting terminal device.
Figure 19:
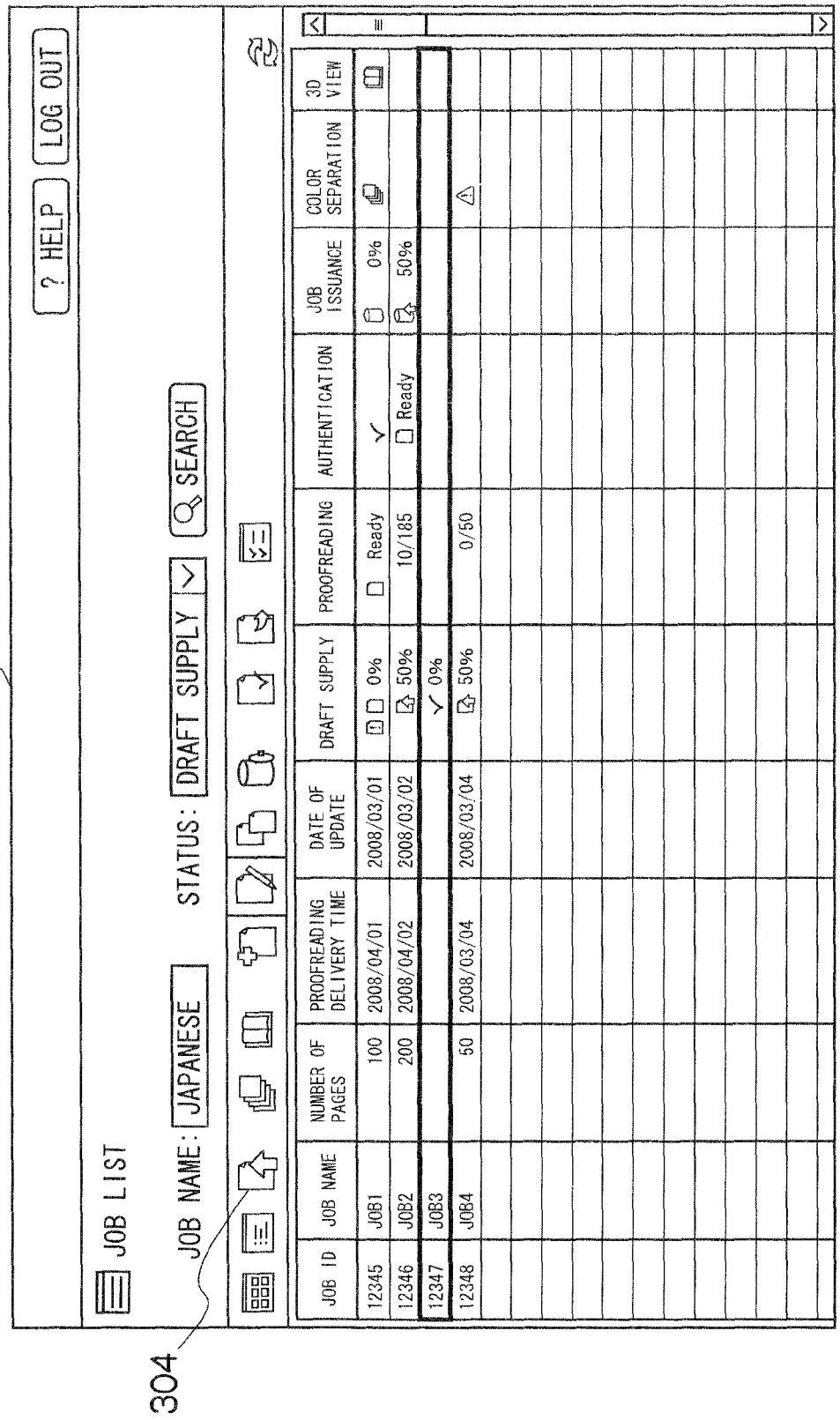
FIG. 19 shows a job list screen on the draft accepting terminal device.

When creation of a draft (a PDF draft) for the printed material is completed, the draft provider or the designer enters his login ID and password on a login screen 300 (FIG. 18) shown on the display section 262 of the draft accepting terminal device 218 to log into the remote server device 212. After the login, a jog list screen 302A (FIG. 19) is displayed on the draft accepting terminal device 218, listing jobs registered on the remote server device 212.

Figure 20:
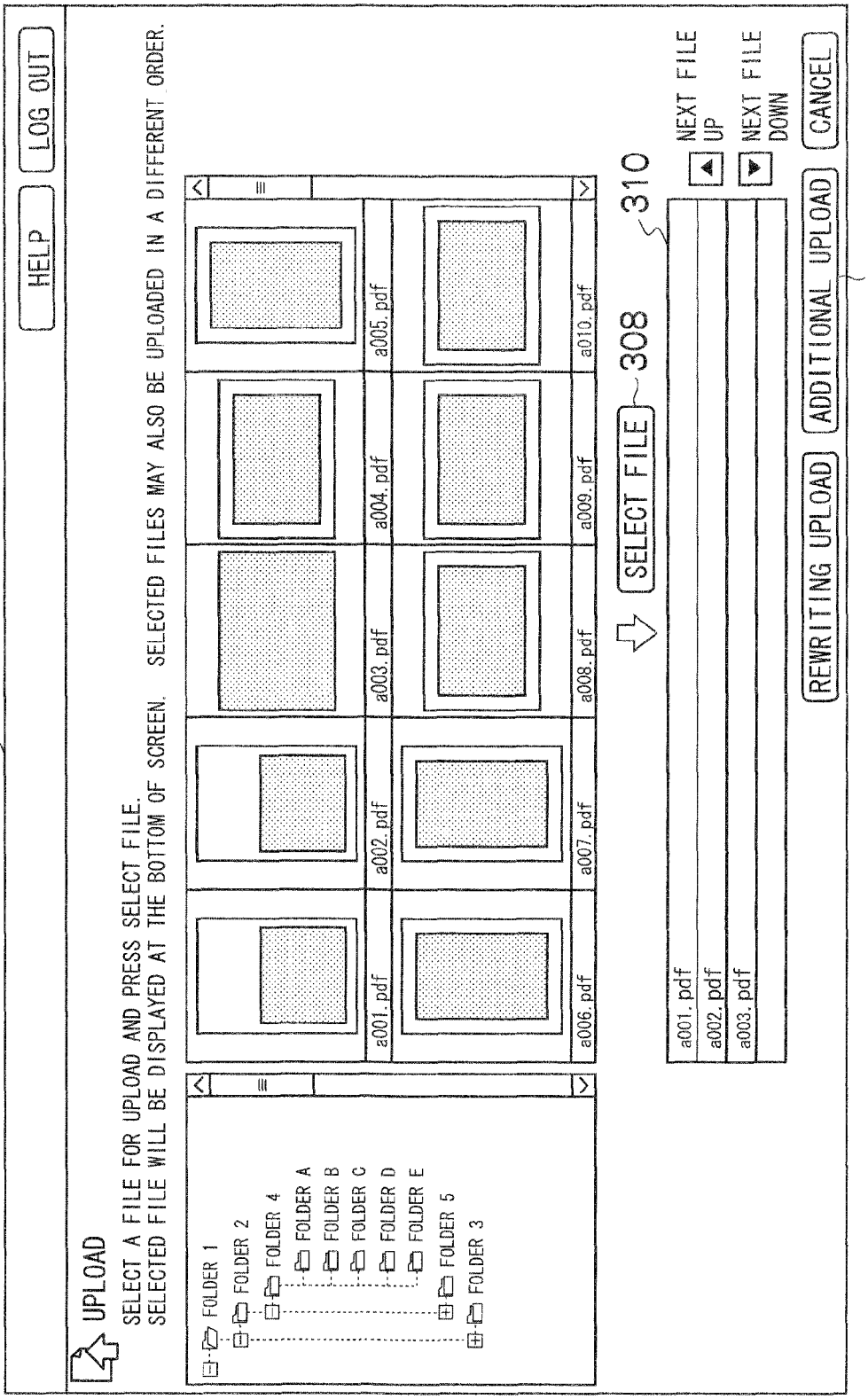
FIG. 20 shows an upload screen on the draft accepting terminal device.

Here, an aspect is preferred that shows only jobs for which access authority is assigned to the logged-in draft provider. When the he/she selects a job as the target of uploading the PDF draft from among the listed jobs by operating a mouse on the operation section 260 and presses an upload button 304, an upload screen 306A (FIG. 20) is displayed on the display section 262 of the draft accepting terminal device 218. The draft provider selects one or more files (PDF drafts) to be transmitted to the remote server device 212 from the file list shown on the upload screen 306A and presses a file selection button 308 so as to display the selected file in a transmission file list window 310 in the lower portion.

In this application example, three PDF drafts (file names "a001.pdf", "a002.pdf" and "a003.pdf") are displayed in the transmission file list window 310. Each of the PDF drafts consists of one or more pages. When the draft provider presses an additional upload button 312, upload (transmission) of the PDF drafts from the draft accepting terminal device 218 to the remote server device 212 is started (step S14 in FIG. 17).

Since one or more PDF drafts can be thus selected and uploaded or passed to the remote server device 212 in the present embodiment, all the draft files (one or more PDF drafts) may be supplied at a time or some of the draft files may be partially supplied. Therefore, when a draft is to be re-supplied, partial supply is also possible by selecting a PDF draft consisting only of corrected pages.

Upon completion of upload of the PDF draft, a job list screen 302B (FIG. 21) appears on the display section 262 of the draft accepting terminal device 218. It is assumed here that all the draft files (PDF files) are supplied at a time at the initial time (i.e., a draft supply rate of 100%).

The remote server device 212 saves the PDF draft uploaded from the draft accepting terminal device 218 in the storage section 232 and transmits the PDF draft to the printing processing server device 214 (step S16 in FIG. 17).

The printing processing server device 214 performs pre-flighting process and color-separation RIP on the PDF draft transmitted from the remote server device 212 using the pre-flighting and color-separation RIP functions described above (step S18). With this, it is determined whether the supplied PDF draft is data suited for printing or not (e.g., a designated font is usable in this system or not), and also an image of R (red), G (green), and B (blue) contained in the PDF draft is converted (raster converted) to a bitmap being color-separated into images of C (cyan), M (magenta), Y (yellow) and K (black) suited for printing. Then, a report indicating the result of pre-flighting (a pre-flighting report) as well as a page color-separated images are provided from the printing processing server device 214 to the remote server device 212.

Upon receiving the pre-flighting report and the page color-separated images from the printing processing server device 214, the remote server device 212 notifies the draft accepting terminal device 218 of completion of transmission. At the same time, the pre-fighting report is also provided.

The remote server device 212 also creates a PDF (a page PDF) for each page of the PDF draft based on the page color-separated images received from the printing processing server device 214, saves it in the storage section 232, and also creates a thumbnail (a page thumbnail) for the page PDF and transmits the page thumbnail to the draft accepting terminal device 218 (step S20). Page thumbnails transmitted from the remote server device 212 to the draft accepting terminal device 218 are saved (or primarily saved) in the storage section 256 of the draft accepting terminal device 218, and displayed as a list in a predetermined window on the display section 262 of the draft accepting terminal device 218 as discussed below.

Figure 23:
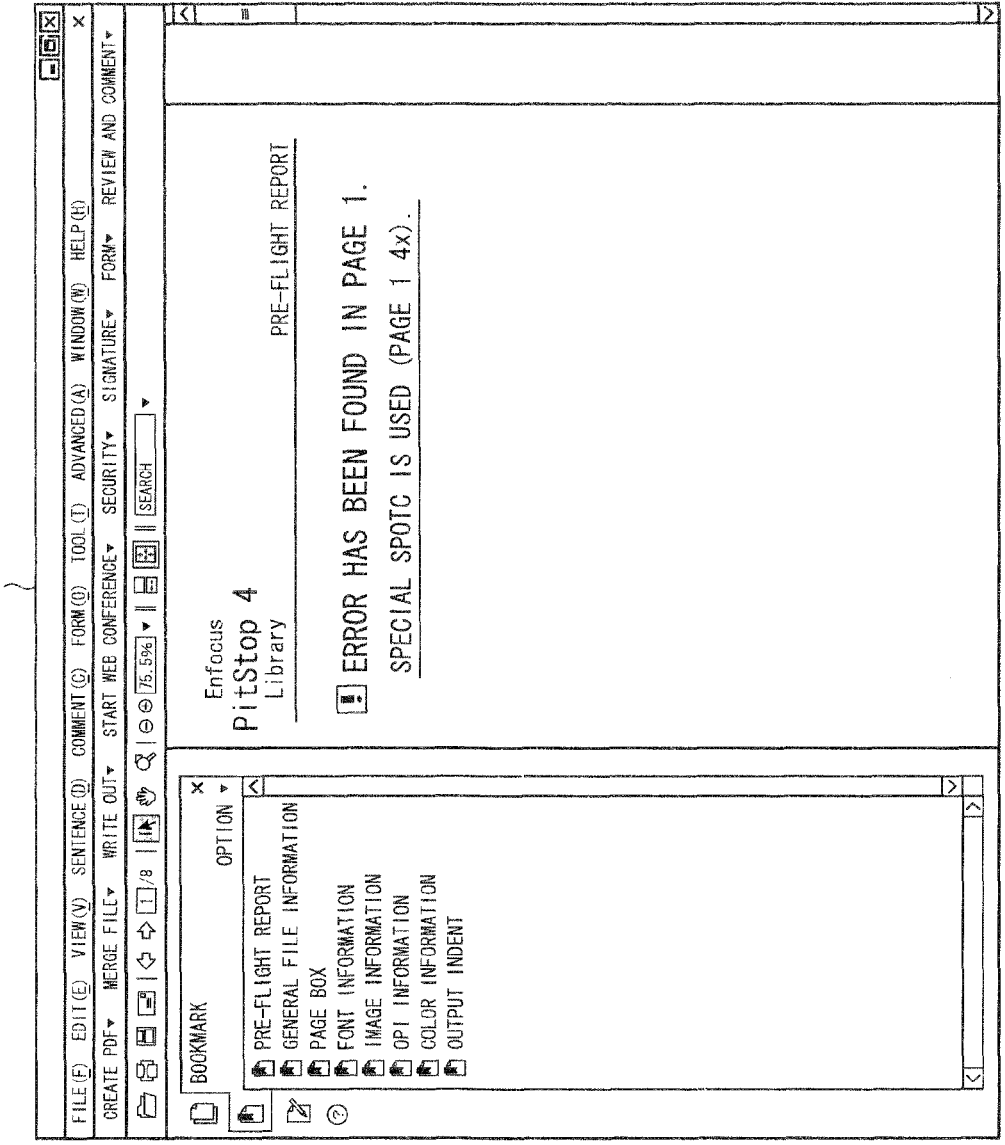
FIG. 23 shows a pre-flighting report screen on the draft accepting terminal device.

By the way, if an error or an alert is present in the pre-flighting report given from the remote server device 212, an error message 314 saying "There is a pre-flight error. Please check it from job details." appears on the upper portion of the job list screen 302B (FIG. 21) on the draft accepting terminal device 218. If the draft provider presses a job detail display button 216 by operating a mouse on the operation section 260, a job detail screen 318 (FIG. 22) is displayed. Here, as an example, three errors and ten alerts are displayed on the job detail screen 318 as a result of pre-flighting process on the supplied PDF draft. Furthermore, pressing of a detail check button 320 on the job detail screen 318 displays a pre-flight report screen 322 (FIG. 23) so that the draft provider can see more detailed error information.

Figure 25:
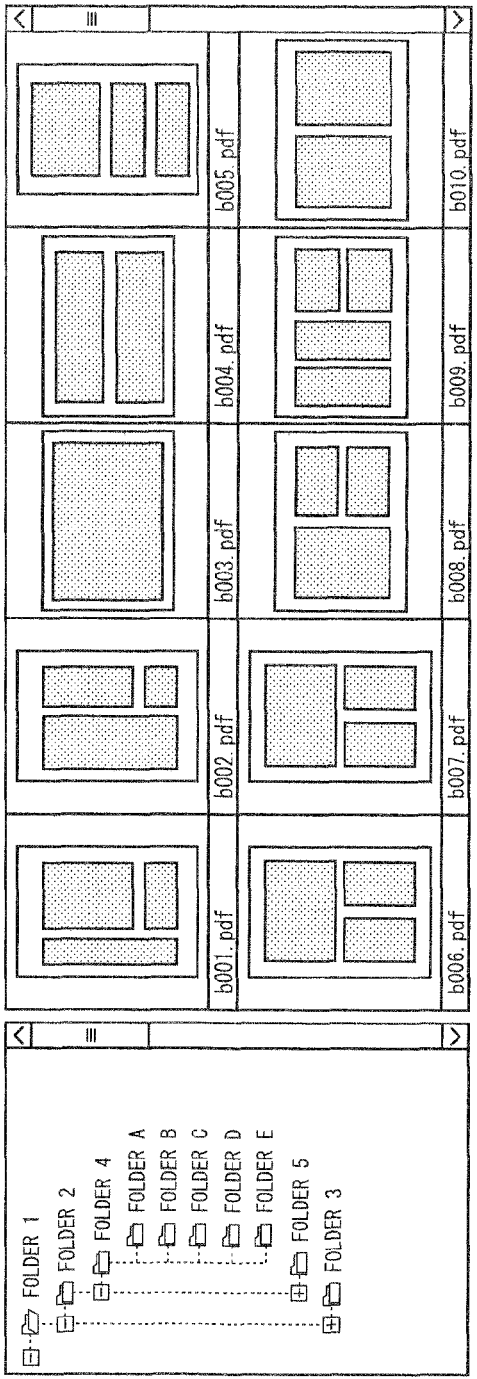
FIG. 25 shows an upload screen on the draft accepting terminal device.

After correcting the PDF draft, the draft provider again logs into the remote server device 212 from the draft accepting terminal device 218 and a job list screen 302C (FIG. 24) appears on the display section 262 of the draft accepting terminal device 218. The draft provider selects a job for which the PDF draft should be uploaded from among listed jobs by operating a mouse on the operation section 260, and when pressing the upload button 304, an upload screen 306B (FIG. 25) is displayed on the display section 262 of the draft accepting terminal device 218.

Then, the draft provider selects a PDF draft that consists only of corrected pages (hereinafter referred to as a "corrected PDF draft") from a file list displayed on the upload screen 306B, and when pressing a file selection button 308, the selected file is displayed on the transmission file list window 310 in the lower portion. In this application example, a corrected PDF draft (file name "b001.pdf") is selected and displayed in the transmission file list window 310. Thereafter, when the draft provider presses a rewriting upload button 326, upload (transmission) of the corrected PDF draft from the draft accepting terminal device 218 to the remote server device 212 is started.

After upload of the corrected PDF draft is completed, pre-flighting process and color-separation RIP on the corrected PDF draft are performed by the printing processing server device 214 just as at the initial draft supply. Then, a job list screen 302D (FIG. 26) is displayed on the display section 262 of the draft accepting terminal device 218. It is assumed here that no error or alert is present in the corrected PDF draft as the result of pre-flighting process (that is, in FIG. 26, the error message 314 shown in FIG. 21 is not displayed).

Figure 27:
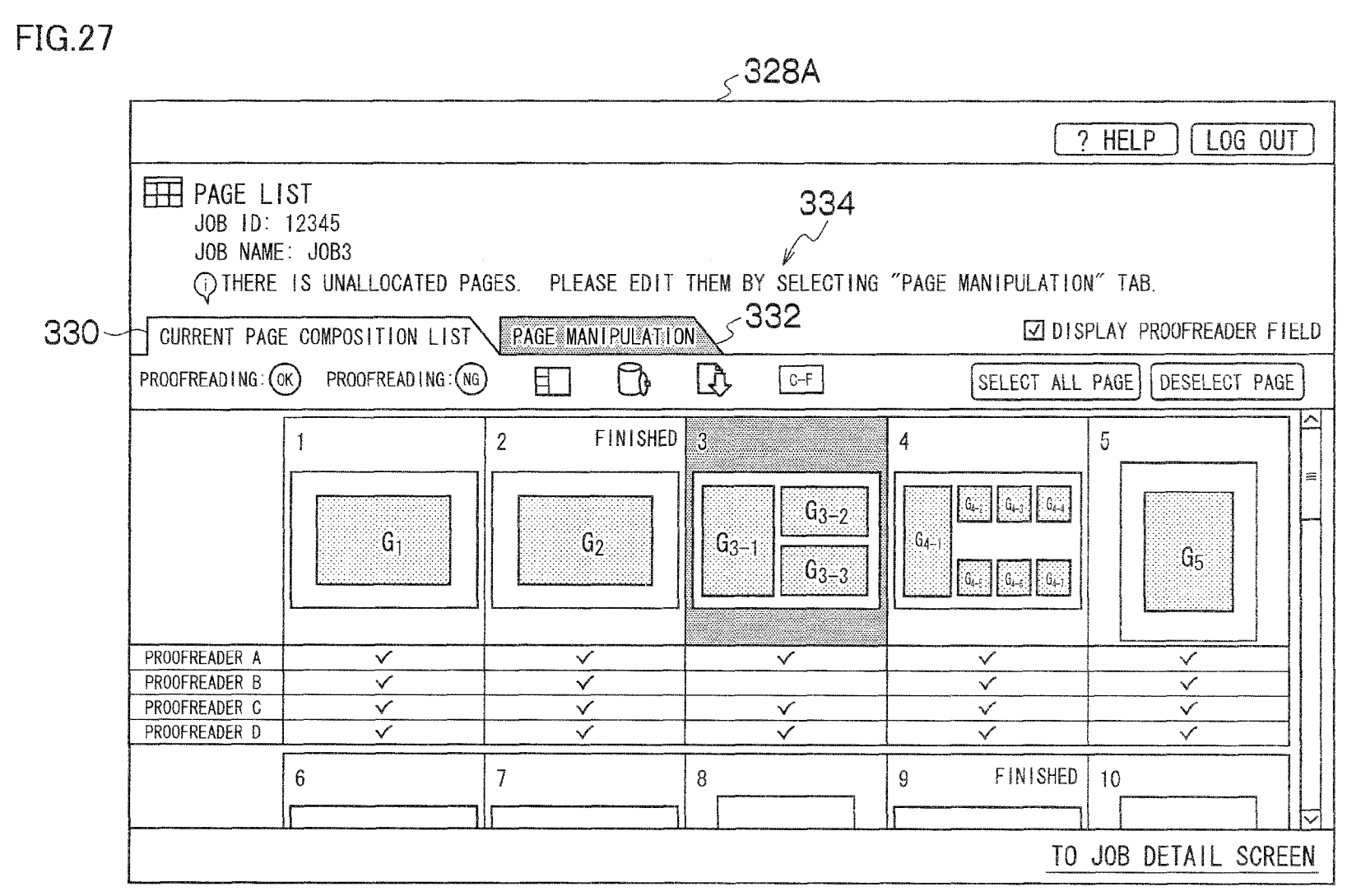

Then, when the draft provider presses the page list button 324 on the job list screen 302D by operating a mouse on the operation section 260, a page list screen 328A (FIG. 27) is appears. The page list screen 328A contains a "current page composition list" tab 330 and a "page manipulation" tab 332, and FIG. 27 shows the "current page composition list" tab 330 is opened. At this point, an alert message 334 saying "There is an unallocated page. Select 'page manipulation' tab and edit the page" is displayed on the upper portion of the page list screen 328B. At the initial draft supply, allocation of each page of the supplied draft (a PDF draft) to each page of the printed material is automatically performed, whereas at the time of re-supply, pages (or corrected pages) of the corrected PDF draft that has been passed are not automatically allocated and such an alert message 334 as shown above is displayed.

Figure 28:
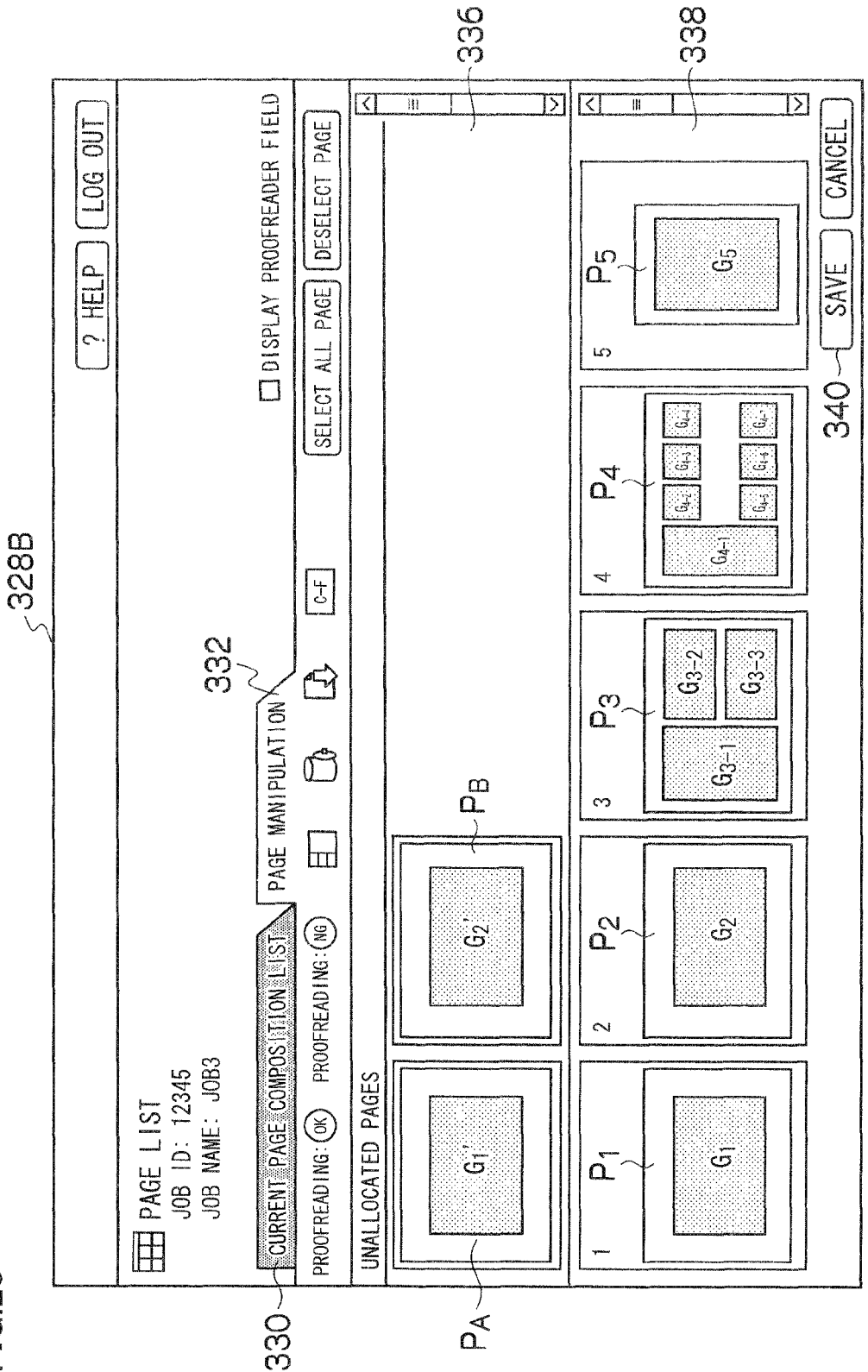
FIG. 28 shows a page list screen on the draft accepting terminal device.

In such a status, when the draft provider opens the "page manipulation" tab 332 through mouse operation on the operation section 260, the page list screen 328B shown in FIG. 28 appears to enable page manipulation. At this point, pages of the corrected PDF draft that has been re-supplied are listed in an "unallocated page list" window 336 on an upper portion of the page list screen 328B, and pages of the PDF draft which have been already allocated are listed in an "allocated page list" window 338.

If the draft provider moves a corrected page $P_B$ displayed in the "unallocated page list" window 336 through mouse operation on the operation section 260 by dragging and dropping it such that it overlies page $P_2$ displayed in the "allocated page list" window 338, for example, the page $P_2$ is replaced with the corrected page $P_B$. Also, if the corrected page $P_B$ is dragged and dropped after being moved to between neighboring pages $P_3$ and $P_4$ displayed in the "allocated page list" window 338, the corrected page $P_B$ is inserted between the neighboring pages $P_3$ and $P_4$. The corrected page $P_B$ assigned to the "allocated page list" window 338 is deleted from the "unallocated page list".

Thus, by replacing a page displayed in the "unallocated page list" window 336 (a page of a re-supplied draft) with a page displayed in the "allocated page list" window 338 or inserting such a page between pages displayed in the "allocated page list" window 338, pages of the re-supplied draft are allocated.

Also, pages displayed in the "allocated page list" window 338 can be changed in page position or deleted through mouse operation on the operation section 260, allowing free change of page order. Although description is omitted, similar page editing can be performed also at the time of initial draft supply by opening the "page manipulation" tab 332 on the page list screen.

Figure 29:
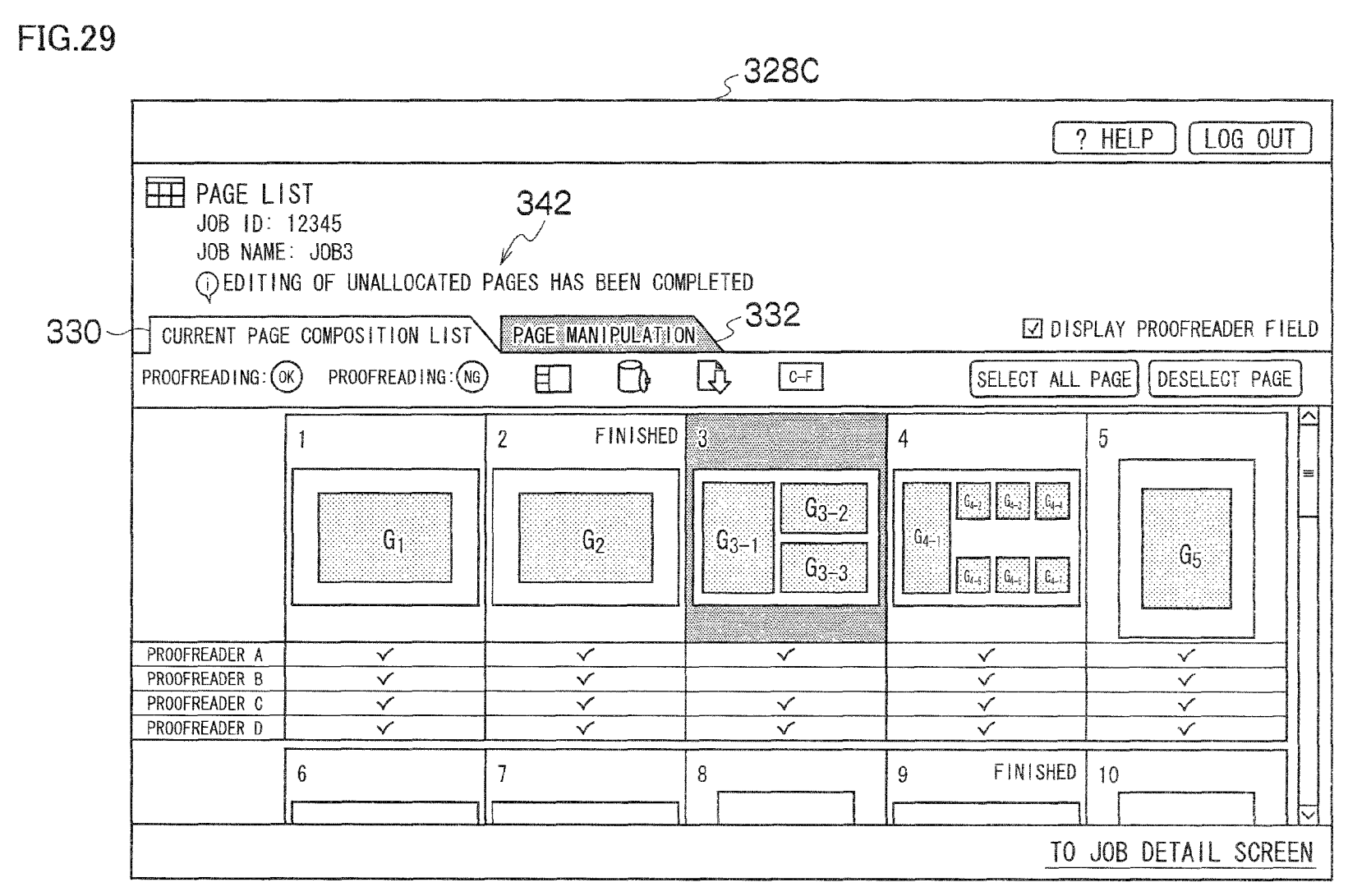

When page allocation is completed for all pages displayed in the "unallocated page list" window 336 and the draft provider presses the save button 340, the remote server device 212 saves page manipulation information in the storage section 244 and notifies the proofreading terminal device 220 of completion of preparation for proofreading. At this point, the page list screen 328C changes to a "current page composition" list tab 330 and shows a message 342 saying "Editing of unallocated pages has been completed" as shown in FIG. 29.

If a page displayed in the "allocated page list" window 338 is replaced with a page displayed in the "unallocated page list" window 336 (i.e., a page of a re-supplied draft), the old page before replacement is not completely deleted but saved in the storage section 232 of the remote server device 212 so that history management of the page is performed by page manipulation information saving function of the remote server device 212. Therefore, a page can be recovered to its original state even after page replacement.

When the draft provider performs page manipulation on the draft accepting terminal device 218 (step S22 in FIG. 17) and completes it, the remote server device 212 saves page manipulation information in the storage section 244 and notifies the proofreading terminal device 220 of completion of preparation for proofreading (step S24).

(Proofreading Process)

When receiving the notification of completion of preparation for proofreading from the remote server device 212, the proofreading terminal device 220 permits proofreading by a proofreader (an ad agency or a client). Here, the remote server device 212 transmits page color-separated images to the proofreading terminal device 220 (step S26), and the proofreading terminal device 220 saves (or primarily saves) the page color-separated images received from the remote server device 212 in the storage section 232 and also performs page color-separated image composition and/or testing image creation in accordance with terminal operation by the proofreader (step S28).

Figure 30:
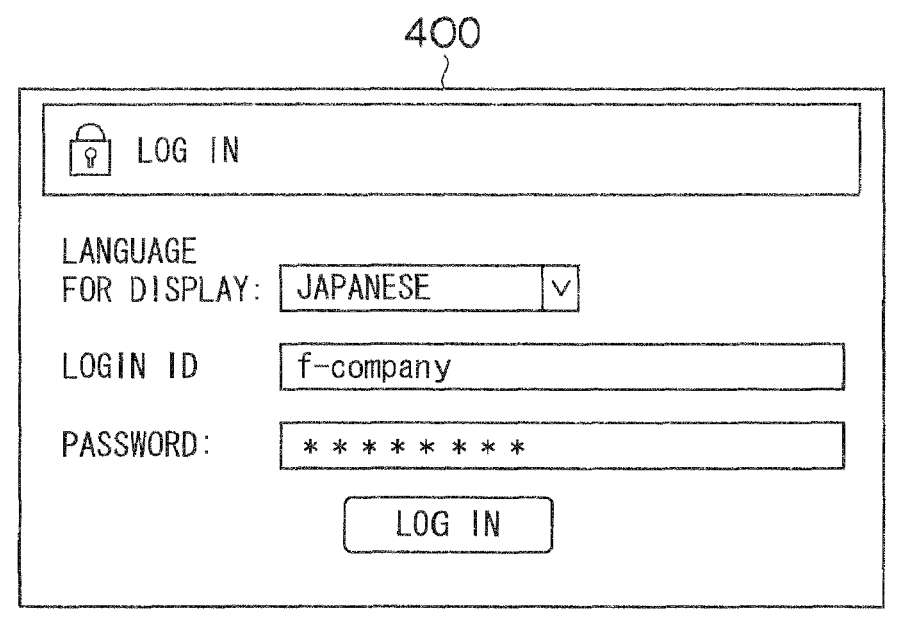
Figure 32:
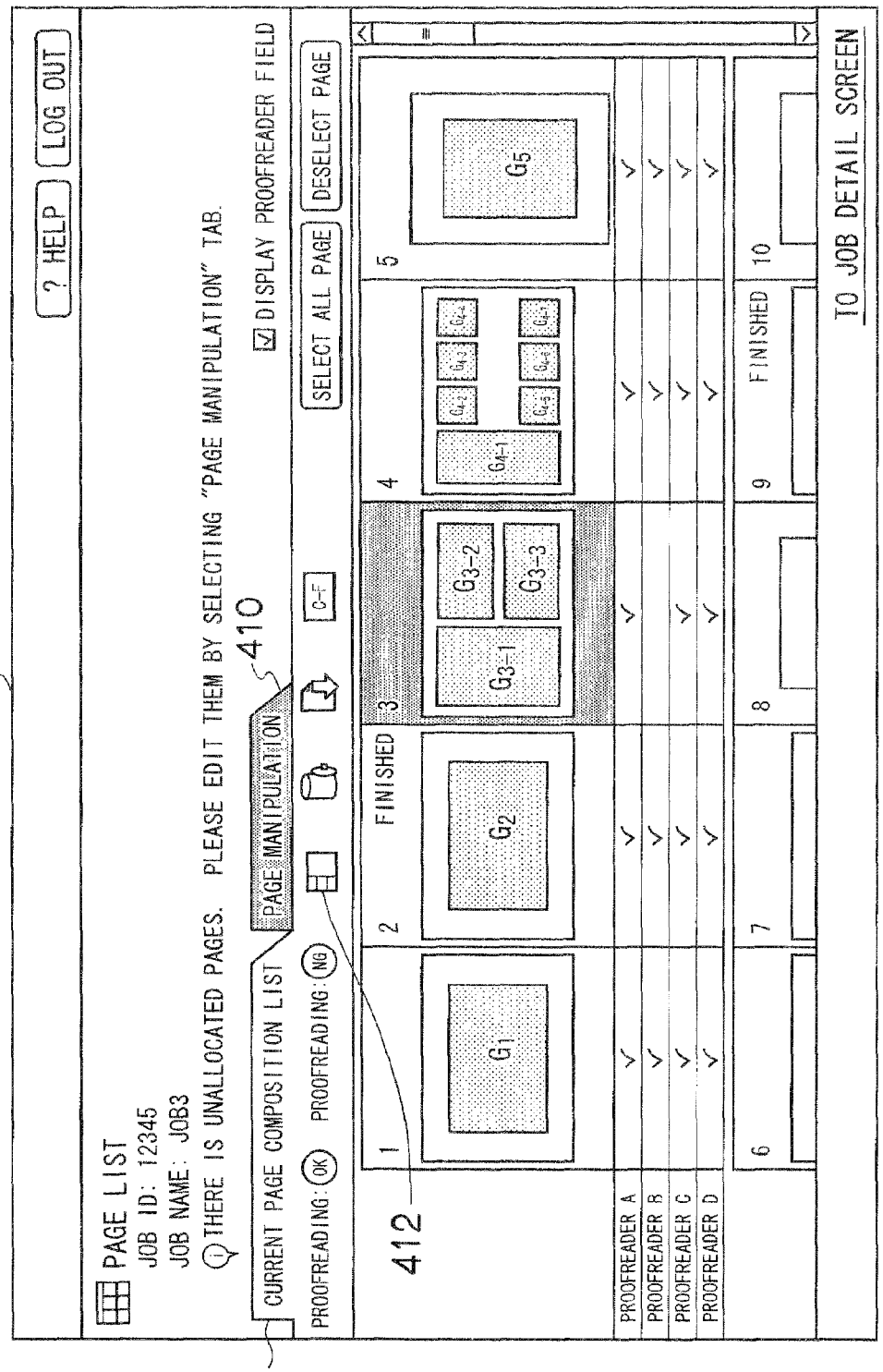
FIG. 32 shows a page list screen on the proofreading terminal device.

The proofreader next enters his/her login ID and password on a login screen 400 (FIG. 30) displayed on the display section 262 of the proofreading terminal device 220 to log into the remote server device 212. After login, a job list screen 402 (FIG. 31) is displayed on the proofreading terminal device 220 and jobs that are registered to the remote server device 212 are listed. Here, an aspect is preferred that displays only jobs for which access authority is granted to the plugged-in proofreader. When the proofreader selects a job for proofreading from the jobs displayed as a list by operating a mouse on the operation section 260 and presses a job list display button 204, a page list screen 406A (FIG. 32) is displayed on the display section 262 of the proofreading terminal device 220.

Figure 33:
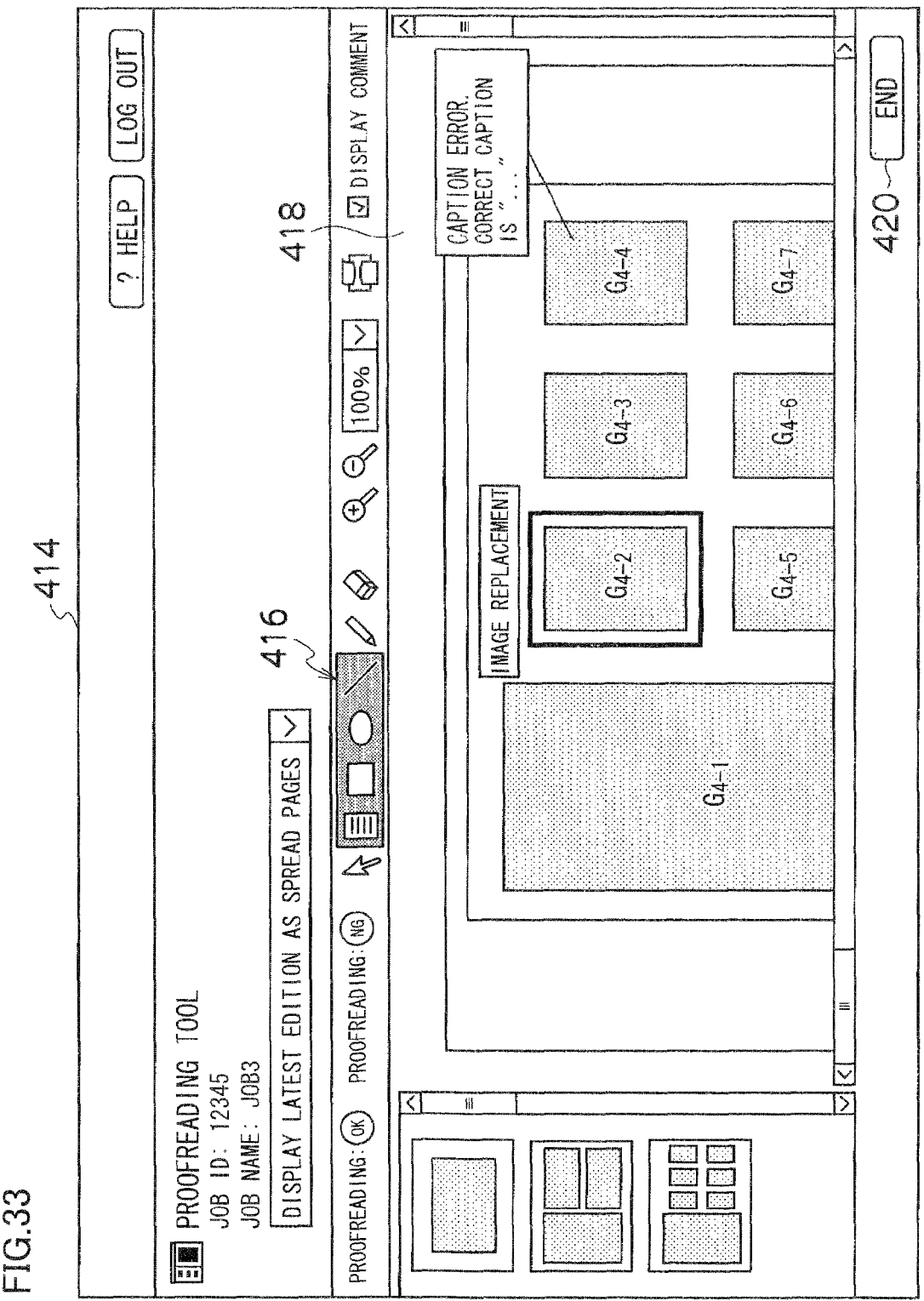
FIG. 33 shows a proofreading tool screen on the proofreading terminal device.

When the proofreader then selects a proofreading target page from the page list displayed on the page list screen 406A by operating a mouse on the operation section 260 and presses a proofreading tool button 412, a proofreading tool screen 414 shown in FIG. 33 is displayed. This enables the proofreader to proofread the target page displayed in a page display window 418 utilizing a graphic/character tool group 416 (step S30 in FIG. 17). FIG. 33 shows as an example a state in which annotation about replacement of an image or the like is added on the proofreading target page by the proofreader.

Figure 34:
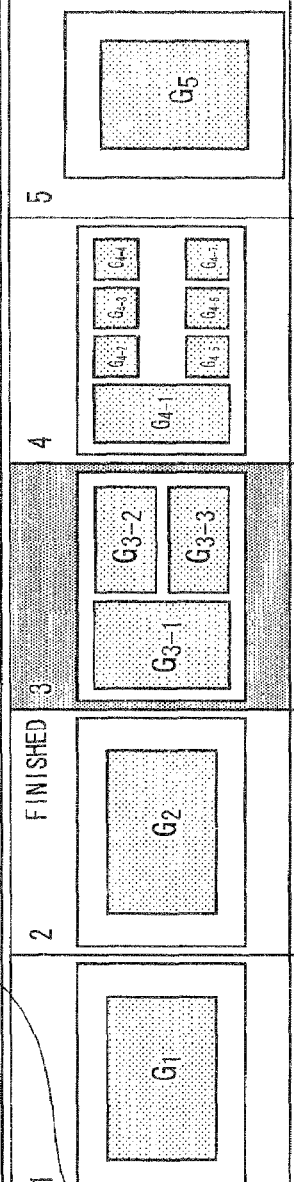
FIG. 34 shows a page list screen on the proofreading terminal device.

When proofreading is thus completed, the proofreader presses an end button 420 to cause a page list screen 406B shown in FIG. 34 to be shown on the display section 262 of the proofreading terminal device 220. If the result of proofreading the target page is satisfactory, the proofreader presses a proofreading OK button 422, and if not satisfactory, presses a proofreading NG button 424. The present example shows that proofreading by proofreader B has been performed and the result of proofreading the target page is not satisfactory.

Thereafter, the proofreading terminal device 220 generates information on proofreading performed by the proofreader and transmits the information to the remote server device 212 (step S32 in FIG. 17). Then, the remote server device 212 saves the proofreading information received from the proofreading terminal device 220 in the storage section 232 (step S34), and notifies the draft accepting terminal device 218 of completion of proofreading. At the same time, the remote server device 212 creates a proofread PDF and transmits it to the draft accepting terminal device 218 (step S36).

(Proofreading Checking to Approval Processes)

The draft provider displays the proofread PDF received from the remote server device 212 on a display screen and checks the proofreading (step S38). The draft provider then corrects the PDF draft in accordance with the proofreading and re-supply from the draft accepting terminal device 218.

Figure 37:
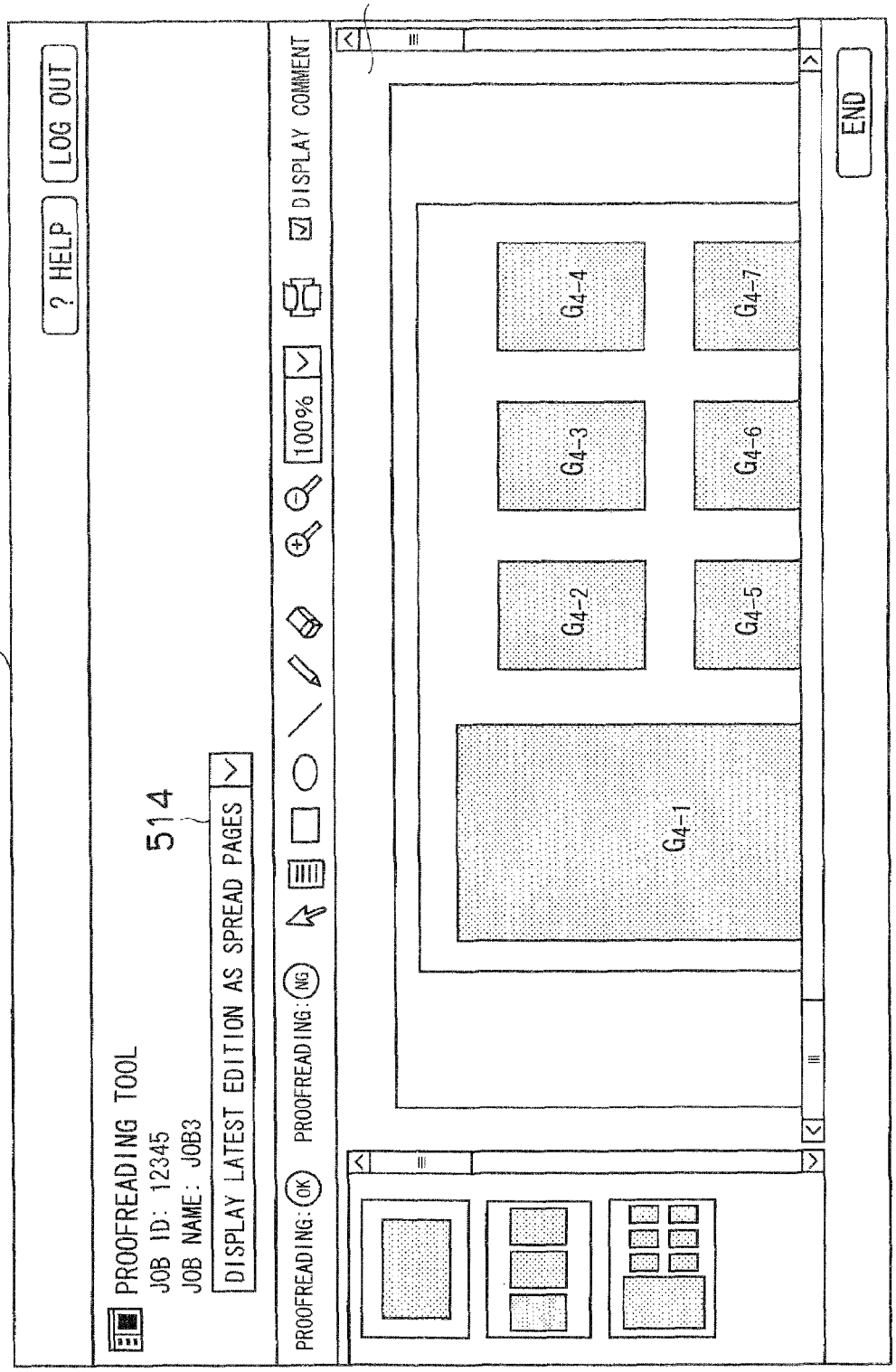
FIG. 37 shows a proofreading tool screen on the proofreading terminal device.

Then, when the proofreader again logs in to the remote server device 212 from the proofreading terminal device 220, a job list screen 500A (FIG. 35) appears on the display section 262 of the proofreading terminal device 220. The proofreader selects a job for proofreading from listed jobs by operating a mouse on the operation section 260 and presses a page list display button 502, causing a page list screen 504A (FIG. 36) to be displayed. The proofreader further selects a proofreading target page from pages displayed on the page list screen 504A and presses a proofreading tool button 510 so as to display a proofreading tool screen 512A (FIG. 37).

Figure 38:
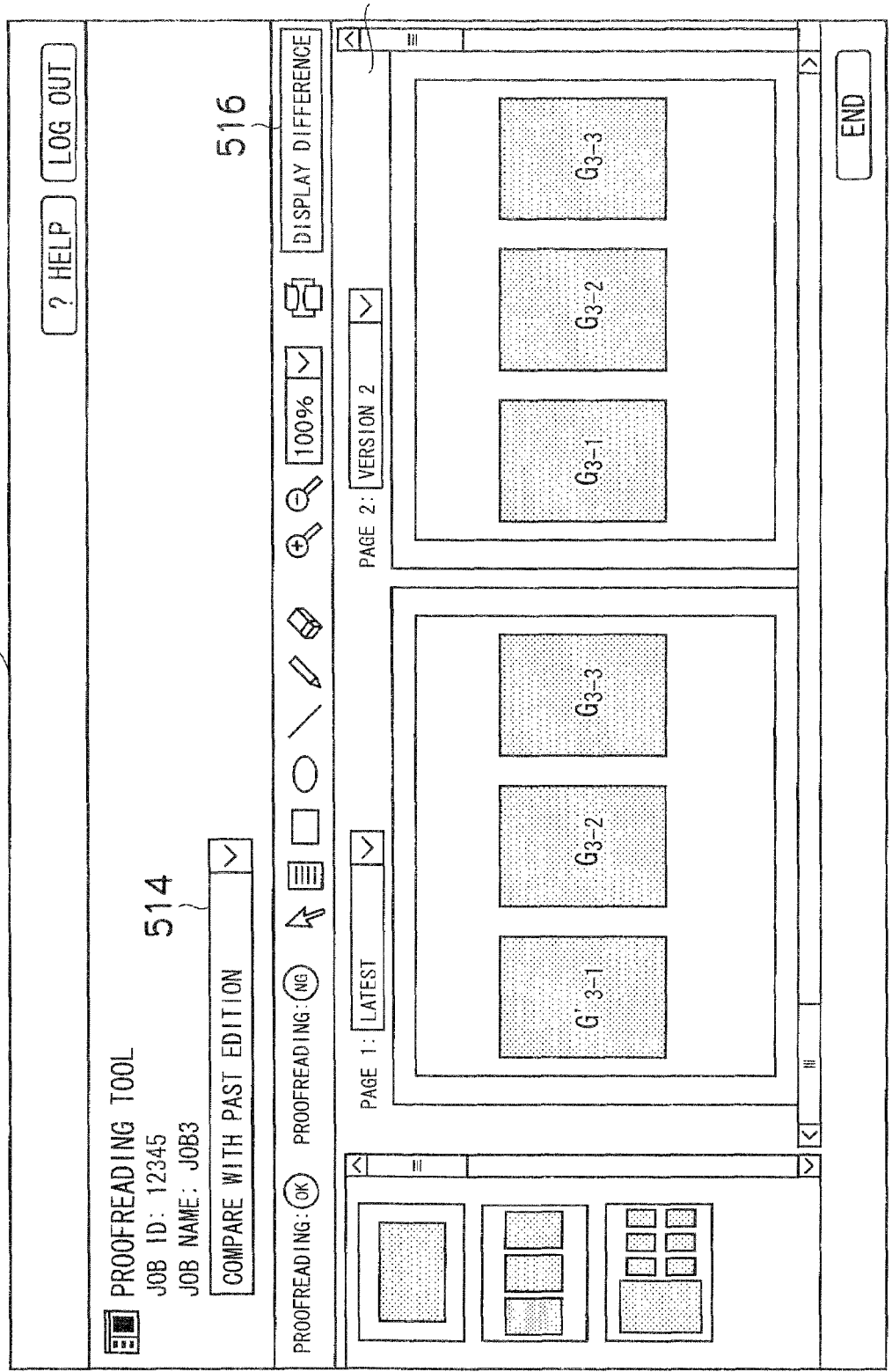
FIG. 38 shows a proofreading tool screen on the proofreading terminal device.
Figure 39:
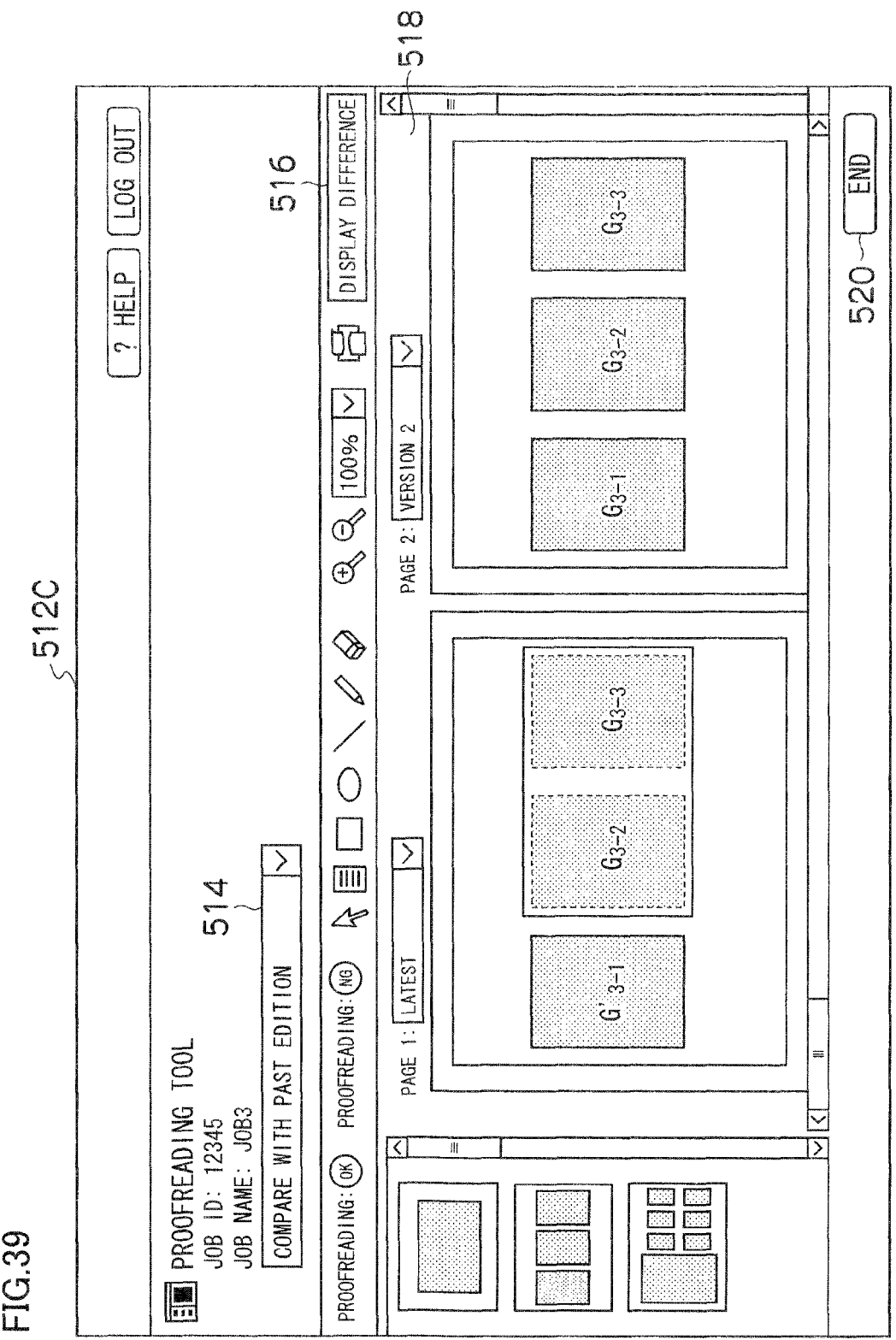
FIG. 39 shows a proofreading tool screen on the proofreading terminal device.

Then, when the proofreader selects "Compare with past edition" from a pull-down menu 514 shown on an upper portion of the proofreading tool screen 512A, the latest edition page (the page on the left) and a past edition page (the page on the right) are displayed side by side in a page display window 518 on the proofreading tool screen 312B as shown in FIG. 38. Furthermore, when "Display difference" button 516 is pressed in this status, the difference between the latest edition page and the past edition page is displayed in a visually comprehensible manner as shown in FIG. 39. In this example, only a portion changed from the past edition page is displayed all the time on the latest edition page and unchanged portions are displayed flashing on and off at certain intervals. The way of indicating the difference is not limited to this, of course, and a changed portion may be surrounded by a box or annotated.

Figure 40:
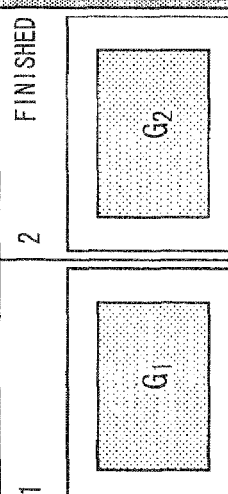
FIG. 40 shows a page list screen on the proofreading terminal device.

This allows the proofreader to easily see whether the draft has been corrected as instructed or not. When the proofreader presses the end button 520, a page list screen 504B (FIG. 40) is displayed on the display section 262 of the proofreading terminal device 220. If the result of proofreading is satisfactory, the proofreader presses a proofreading OK button 522. If proofreading of all the pages of the draft is completed at this point, a message 524 saying "Proofreading of all pages is completed" is displayed as shown in FIG. 40. Thus, re-supply of a draft and proofreading are repeated until all the pages of the draft have been proofread, and when proofreading of all the pages is completed (step S40), the result thereof is provided to the remote server device 212 and a job approval is registered to the remote server device 212 (step S42).

(Printing Ordering Process)

When a printing order issuer (a printing company) logs into the remote server device 212 from the job creation/management terminal device 216, a job list screen 530 (FIG. 41) is displayed on the display section 262 of the job creation/management terminal device 216.

He/she selects a job for which finish condition should be checked from among jobs listed on the job list screen 530 shown in FIG. 41 and presses a finish condition display button (not shown) to change the screen to a finish condition display screen (see FIGS. 1 and 9). When a desired page is selected in a preview list on the finish condition display screen, a preview image of the selected page is displayed superimposed with a reverse transmissive image on the back side of the selected page and a transmissive image of a page that is laid under the selected page.

The person in charge of printing checks the finish condition confirmation screen and, if he/she determines that the reverse transmissive image on the back side or the transmissive image on the underlying page affects the image on the selected page, can take measures such as change of imposition or paper type. On the other hand, if he/she determines that the image on the selected page is not affected, printing is carried out. Ones of jobs listed on the job list screen 530 shown in FIG. 41 that have a check in "3D view box" indicate that the jobs can be 3D-displayed.

Then, when a job for which printing should be ordered is selected from jobs listed on the job list screen 530 and a printing order button 532 is pressed, printing is ordered from the job creation/management terminal device 26 to the remote server device 212 (step S44), and the remote server device 212 creates a printing job and transmits it to the printing processing server device 214 (step S46). For example, the printing job is created in a file format compliant with PDF/X that supports JDF, and provided to the printing processing server device 214. Upon receiving the printing job from the remote server device 212, the printing processing server device 214 registers the printing job (step S48).

In this way, preparation for printing on a printing machine that is provided for the printing processing server device 214 completes and a printing operation is carried out on individual printing machines in accordance with the registered printing job. The printing machines 224 and 226 described in FIG. 11 are JDF supporting devices and are capable of automated processing up to output in accordance with description of the JDF received from the printing processing server device 214.

For a printing company, the workflow management system according to the present embodiment thus enables automated processing because complete data is supplied in upstream processes and allows progress of each job to be easily grasped. It also can electronically issue printing orders.

For a proofreader (an agency or a client), it is possible to give proofreading order immediately, check history of proofreading, and readily check editing performed by a draft creator (e.g., a designer). It also has an advantage of the ability to leave a result of approval as evidence.

Particularly according to the present embodiment, some pages of a printed material can be partially supplied and also allocation of pages can be performed by replacing a page of a newly supplied draft with a page of a draft which has already been allocated or inserting such a page between pages. Therefore, only corrected pages can be passed without supplying all pages even when re-supply is required and the order of pages can be edited after supply thereof. Also, when a draft for a printed material is created by a number of draft creators, each of the creators can create pages he/she is in charge of and supply the pages without waiting for completion of other pages. Accordingly, editing of page order can be managed in a unified way, which can improve efficiency of draft supplying tasks and enable fast supply. When page replacement is performed, older pages are not completely deleted from the system but can be recovered through page history management.

Also, in this application example, in realization of the partial supply of a draft mentioned above, version management of a printed material is effected by managing the edition of the draft of the printed material on a per-page basis (version management). That is to say, edition number is managed for each page as shown in FIG. 42. The latest edition numbers of pages need not be necessarily the same but may be different. As an example, in FIG. 42, the latest edition number of pages is the second edition for pages 1 and 2, first edition for page 3, and third edition for page 4. Not only the latest edition number of each page but also pages of older edition numbers are also saved in the system (the storage section 232 of the remote server device 212) for each page. And as shown in FIG. 43, edition management of a printed material is maintained as information on combinations of editions of pages that constitute the printed material. As an example, in FIG. 43, the first edition (edition 1) of the printed material is composed only of page 1 (edition 1) and page 2 (edition 1), thereafter partial supply of the draft is performed on individual pages to update the edition number of the pages separately as needed. As a result, in the fifth edition of the printed material, pages 1 and 2 are the second edition, page 3 is the first edition, and page 4 is the third edition.

By managing edition of a printed material based on edition management on a page basis (version management), the partial supply of a draft described above can be more effectively realized. As a result, even when only some pages of a draft has to be corrected, only corrected pages can be passed without newly supplying all the pages of the draft, which can improve the speed and efficiency of a draft supply task.

While this application example shows an aspect for checking the finish condition of a (book) printed material during a printing process, it may also be checked in the process of proofreading (on the proofreading terminal device 220 of FIG. 1). It may also be conducted during a draft file creation process (on the draft accepting terminal device 218 of FIG. 1).

That is, the processes of the printed material finish condition display method described above may be constructed into a computer-executable program. By installing such a finish condition display program on the terminal devices (server devices) shown in FIG. 11, the finish condition of a printed material can be checked as necessary in each process shown in the above application example.

While the image display method and image display apparatus as well as a printing assisting system according to the present invention has been described in detail, the present invention is not limited to the example above and it goes without saying that various modifications and/or variations may be made without departing from the scope of the invention.

What is claimed is:

1. An image display method comprising the steps of:
with a display device, displaying a first image which represents contents printed on a front surface of a first recording medium and a layout of the contents on the front surface of the first recording medium;
using a transmissive image generating device, and with a second recording medium laid under the first recording medium with a front surface of the second recording medium facing a rear surface of the first recording medium, the second recording medium including a second image which represents contents printed on a front surface of the second recording medium, generating on the front surface of the first recording medium, a transmissive image which represents the second image printed on the front surface of the second recording medium laid under the first recording medium as seen through the first recording medium; and with the display device, displaying the transmissive image superimposed on the first image printed on the front surface of the first recording medium, wherein said first recording medium is translucent, and said second recording medium is movable relative to said first recording medium.

2. The image display method according to claim 1, wherein the transmissive image is generated from printing data for the second image printed on the front surface of the second recording medium.

3. The image display method according to claim 1 further comprising the steps of:

with the display device, generating a reverse transmissive image that represents a third image printed on a back surface of the first recording medium as seen through the first recoding medium; and with the display device, displaying the reverse transmissive image superimposed on the first image printed on the front surface of the first recording medium and on the transmissive image of the second image.

4. The image display method according to claim 3, wherein the third image of the back surface transmissive image is generated from printing data which is printed on the back surface of the first recording medium.

5. The image display method according to claim 3, wherein the transmissive image and the reverse transmissive image are generated based on an amount of light that reaches an observation position viewing the front side of the first recording medium.

6. The image display method according to claim 5, wherein an amount of light that reaches the observation position includes at least one of reflected light and transmitted light from the first and second recording media.

7. The image display method according to claim 5, wherein an amount of observed light, gl (x, y), as seen from the front surface of the first recording medium when a position on the front surface of the first recording medium is represented by x and y coordinates is expressed by:

$$gl(x,y)=lp1(x,y)+lp2(x,y)+lp3(x,y)$$

where lp1 represents lightness of reflected light from the front surface of the first recording medium, lp2 represents lightness of reflected light from the back surface of the first recording medium, and lp3 represents lightness of reflected light from the front surface of the second recording medium.

8. The image display method according to claim 7, wherein a printed material including the first recording medium and the second recording medium is three-dimensionally displayed.

9. An image display apparatus, comprising:

a display device which displays a first image which represents contents printed on a front surface of a first recording medium and a layout of the contents on the front surface of the first recording medium; and a transmissive image generating device which, with a second recording medium laid under the first recording medium with a front surface of the second recording medium facing a rear surface of the first recording medium, the second recording medium including a second image which represents contents printed on a front surface of the second recording medium, generates, on the front surface of the first recording medium, a transmissive image which represents the second image printed on the front surface of the second recording medium laid under the first recording medium as seen through the first recording medium, wherein the display device displays the transmissive image superimposed on the first image printed on the front surface of the first recording medium, and wherein said first recording medium is translucent, and said second recording medium is movable relative to said first recording medium.

10. A printing assisting system, comprising:

a server device;

a terminal device connected to the server device via a network; and a printing device which is connected to the terminal device, wherein the terminal device comprises:

a display device which displays a first image which represents contents printed on a front surface of a first recording medium and a layout of the contents on the front surface of the first recording medium based on printing data transmitted from the server device; and a transmissive image generating device which, with a second recording medium laid under the first recording medium with a front surface of the second recording medium facing a rear surface of the first recording medium, the second recording medium including a second image which represents contents printed on a front surface of the second recording medium, generates, on the front surface of the first recording medium, a transmissive image which represents the second image printed on the front surface of the second recording medium laid under the first recording medium as seen through the first recording medium based on printing data transmitted from the service device, wherein the display device displays the transmissive image superimposed on the first image printed on the front surface of the first recording medium, and wherein said first recording medium is translucent, and said second recording medium is movable relative to said first recording medium.

11. The printing assisting system according to claim 10, further comprising a printing material creating device which creates a printed material that includes the first recording medium and the second recording medium and is printed by the printing device based on the printing data.

* * * * *